United States Patent
Ieda

(10) Patent No.: US 7,822,337 B2
(45) Date of Patent: Oct. 26, 2010

(54) APPARATUS AND METHOD FOR IMAGE CAPTURING, APPARATUS AND METHOD FOR PLAYBACK, AND PROGRAM

(75) Inventor: Junichi Ieda, Aichi (JP)

(73) Assignee: Sony Corporation (JP)

( * ) Notice: Subject to any disclaimer, the term of this patent is extended or adjusted under 35 U.S.C. 154(b) by 950 days.

(21) Appl. No.: 11/654,395

(22) Filed: Jan. 17, 2007

(65) Prior Publication Data

US 2007/0206944 A1    Sep. 6, 2007

(30) Foreign Application Priority Data

Jan. 18, 2006    (JP)    ............ P2006-009775

(51) Int. Cl.
*G03B 17/18* (2006.01)
*H04N 5/222* (2006.01)
(52) U.S. Cl. .............. 396/287; 348/333.02; 348/333.05
(58) Field of Classification Search ............... 396/311, 396/281, 287; 386/107; 348/333.01, 333.02, 348/333.04, 333.05
See application file for complete search history.

(56) References Cited

U.S. PATENT DOCUMENTS

| 6,952,229 B1 | 10/2005 | Takahashi et al. |
| 2004/0013413 A1 | 1/2004 | Tanaka et al. |

FOREIGN PATENT DOCUMENTS

| JP | 1-005171 A | 1/1989 |
| JP | 7-226983 A | 8/1995 |
| JP | 7-283982 A | 10/1995 |
| JP | 11-289484 | 10/1999 |
| JP | 11-312042 A | 11/1999 |
| JP | 2000-041161 A | 2/2000 |
| JP | 2000-041163 A | 2/2000 |
| JP | 2000-101879 | 4/2000 |
| JP | 2000-333116 A | 11/2000 |
| JP | 2003-08946 | 6/2001 |
| JP | 2004-190181 | 7/2004 |
| WO | WO-00/31614 | 6/2000 |

OTHER PUBLICATIONS

HDR-HC1 Instruction manual [online] Sony Corporation, 2005. (Aquisition: URL:http://upport.d-imaging.sony.co.jp/www/handycam/products/hdr-hc1/index.html, Acquisition day: Mar. 16, 2009). (Cited p. 20-21, 26-28, and 65).

English Translation of Japanese Office Action dated Mar. 23, 2009, issued in Japanese Application No. 2006-009775.

Sony HandyCam, Jul. 31, 2003, http://www.sony.co.jp/SonyDrive; http://www.sony.co.jp/cam; Copyright 2009 Sony Marketing (Japan) Inc.

English Translation of Japanese Office Action issued on Jul. 14, 2009, issued in Japanese Patent Application No. 2006-009775.

*Primary Examiner*—Rochelle-Ann J Blackman
(74) *Attorney, Agent, or Firm*—Lerner, David, Littenberg, Krumholz & Mentlik, LLP

(57) ABSTRACT

An image capturing apparatus for capturing a first image of a subject may include a detecting unit, a determining unit, and a display control unit. The detecting unit detects a user's operation for instructing activation of a function. The determining unit determines whether or not an instruction of capturing the first image is given on the basis of the detected instruction. The display control unit controls, when the instruction of capturing the first image is determined to be given, displaying of a third image among second images so that the third image is not superimposed on the first image. The second images allow the user to instruct activation of various functions. The third image allows the user to instruct activation of a function that is not operable by the user during the image capturing operation.

26 Claims, 14 Drawing Sheets

141A  141C 141B  141C

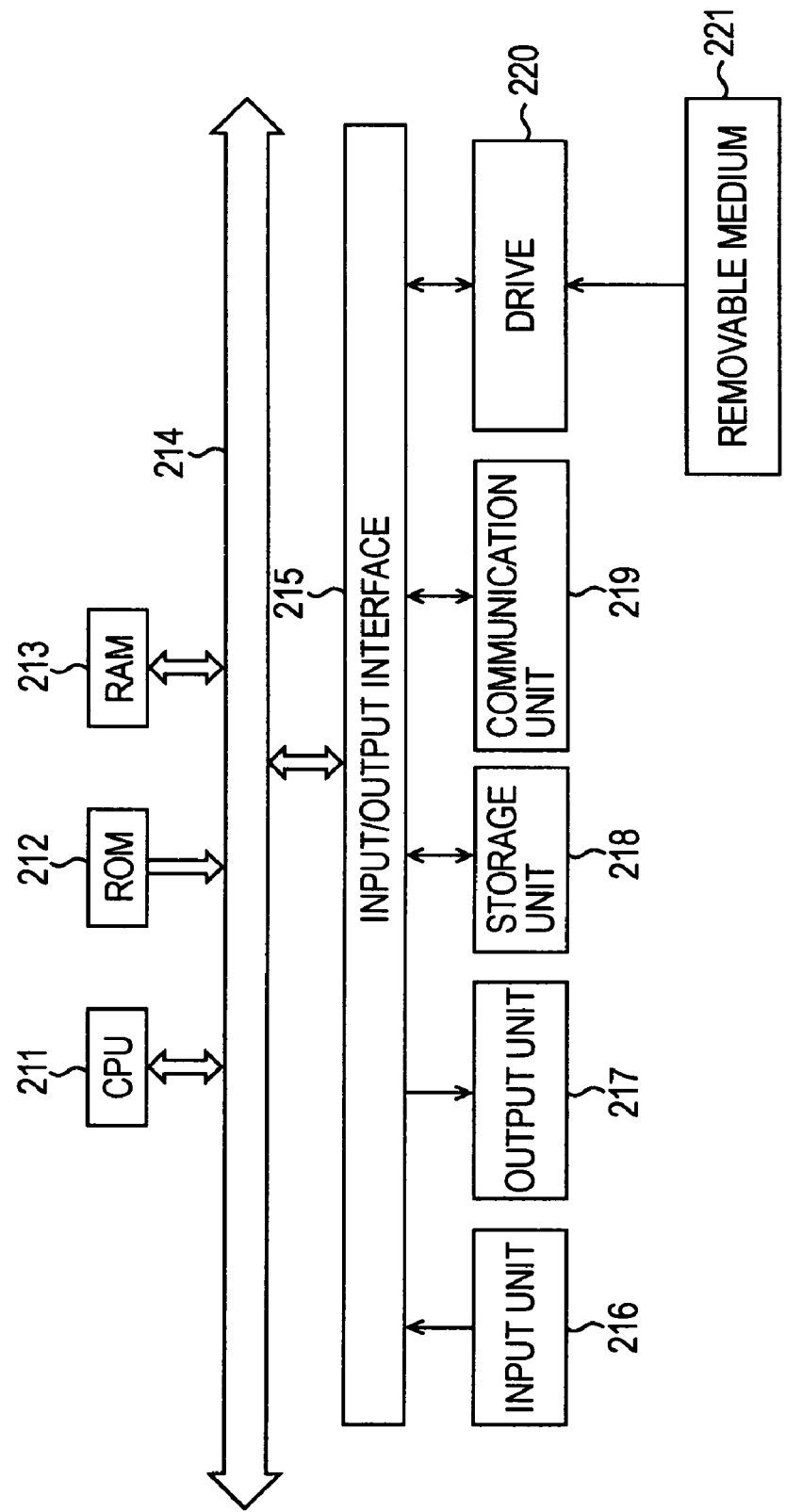

APPARATUS AND METHOD FOR IMAGE CAPTURING, APPARATUS AND METHOD FOR PLAYBACK, AND PROGRAM

CROSS-REFERENCE TO RELATED APPLICATIONS

This application claims priority from Japanese Patent Application No. JP 2006-009775 filed in the Japanese Patent Office on Jan. 18, 2006, the entire content of which is incorporated herein by reference.

BACKGROUND OF THE INVENTION

1. Field of the Invention

The present invention relates to apparatuses and methods for image capturing, apparatuses and methods for playback, and programs, in particular, to an apparatus and method for image capturing, an apparatus and method for playback, and a program that can improve operationality.

2. Description of the Related Art

Digital video cameras that employ a touch panel placed on an LCD (Liquid Crystal Display) panel are widely used. Touch panels allow users to perform operations by directly touching a screen thereof with a finger or the like.

Many currently available digital video cameras have functions of recording movies and still images on a plurality of recording media equipped thereto. These digital video cameras have modes, each set for the corresponding recording medium. Users change the modes by operating a switch. For example, a digital camera, which records images on recording media such as a magnetic tape and a memory card, has "a tape recording mode" and "a memory card recording mode". In the "tape recording mode", the digital video camera records images on the magnetic tape, whereas, in the "memory card recording mode", the digital video camera records images on the memory card. Users change between these two modes by operating the switch.

In the "tape recording mode", as shown in FIG. 1, buttons 1A and 1C are displayed on a screen of an LCD panel of the digital video camera. The button 1A allows users to instruct viewing of movies (or still images) recorded on the magnetic tape, whereas the button 1C allows users to instruct displaying of a menu screen having operation items listed thereon. Additionally, in the "memory card recording mode", as shown in FIG. 2, buttons 1B and 1C are displayed on the screen of the LCD panel. The button 1B allows users to instruct viewing of still images (or movies) recorded on the memory card.

That is, a known digital video camera displays buttons for functions relating to the magnetic tape in the "tape recording mode", whereas the known digital video camera displays buttons for functions relating to the memory card in the "memory card recording mode".

In addition, some digital video cameras have a function of recording movies and still images on a plurality of recording media in a single mode regardless of the mode set for each recording medium. For example, a digital video camera records movies and still images on a plurality of recording media such as a magnetic tape and a memory card regardless of the above-described modes, i.e., the "tape recording mode" and the "memory card recording mode".

In this case, the digital video camera records images in a single mode regardless of the types of the recording media. Thus, as shown in FIG. 3, buttons 1A to 1C are displayed on a screen of an LCD panel.

That is, a known digital video camera displays buttons allowing users to instruct functions relating to both the magnetic tape and the memory card, when recording movies and still images on the magnetic tape and the memory card in a single mode (i.e., regardless of the modes set for the corresponding recording media).

Furthermore, an image capturing apparatus that displays a first icon, if content recorded on a first recording medium is not being played back in a playback mode set for the first recording medium and the apparatus is equipped with a second recording medium, is provided (See, for example, Japanese Unexamined Patent Application Publication No. 2003-8946). The first icon allows users to instruct playing back of content recorded on the second recording medium.

Since buttons are superimposed on a displayed image to allow users to select the buttons with touch panels, the buttons may cover the displayed image. Thus, users may undesirably have trouble seeing the displayed image.

For example, buttons 1A and 1B that are not touched while capturing images with a known digital video camera may cover the image being captured and displayed on an LCD panel. Due to this, users may have trouble seeing and confirming the image being captured.

In addition, some of buttons displayed on a touch panel are unnecessary and are not used by users. Displaying of these unnecessary buttons may irritate the users.

For example, a known digital video camera displays buttons for functions relating to all recording media while recording movies and still images on a plurality of recording media in a single mode. Users not using one of the recording media may consider the buttons allowing the users to instruct functions regarding the unused recording medium unnecessary. Displaying these buttons increases the number of buttons to be displayed, which may cause inconvenience.

More specifically, a digital video camera that records images on a magnetic tape and a memory card displays buttons 1A to 1C on a screen of an LCD panel thereof. Thus, for example, users not using the memory card do not need the button 1B. Displaying the button 1B may irritate the users.

Furthermore, an image capturing apparatus disclosed in Japanese Unexamined Patent Application Publication No. 2003-8946 records data on each recoding medium in separate modes for a first recording medium and a second recording medium. As described above, technological development now permits image capturing apparatuses to record data on both the first and second recording media in a single mode not in separate modes for each recording medium. In such a case, image capturing apparatuses that control displaying of buttons (e.g., icons) for each mode may not appropriately display the buttons.

SUMMARY OF THE INVENTION

Embodiments of the present invention are made in view of such circumstances, and can improve operationality.

According to a first aspect of the present invention, an image capturing apparatus for capturing a first image of a subject may include detecting means for detecting a user's operation for instructing activation of a function, determining means for determining whether or not an instruction of capturing the first image is given on the basis of the detected instruction, and display control means for controlling, when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

The display control means may control, when the instruction of capturing the first image is determined not to be given, displaying of the third image so that the third image is superimposed on the first image.

The second images may include a first icon allowing the user to instruct displaying of a screen that allows a user to select various functions, a second icon allowing the user to instruct activation of a function that is operable by the user when the image capturing apparatus is equipped with a first recording medium, and a third icon allowing the user to instruct activation of a function that is operable by the user when the image capturing apparatus is equipped with a second recording medium. The third image may be one of the second icon and the third icon.

According to a second aspect of the present invention, an image capturing method for an image capturing apparatus for capturing a first image of a subject may include the steps of detecting a user's operation for instructing activation of a function, determining whether or not an instruction of capturing the first image is given on the basis of the detected instruction, and controlling, when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

According to a third aspect of the present invention, a program causes a computer of an image capturing apparatus for capturing a first image of a subject to perform an image capturing process. The process may include the steps of detecting a user's operation for instructing activation of a function, determining whether or not an instruction of capturing the first image is given on the basis of the detected instruction, and controlling, when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

In the first, second, and third aspects of the present invention, a user's operation for instructing activation of a function is detected. Whether or not an instruction of capturing the first image is given is determined on the basis of the detected instruction. When the instruction of capturing the first image is determined to be given, displaying of a third image allowing the user to instruct activation of a function that is not operable by the user during the image capturing operation among second images allowing the user to instruct activation of various functions is controlled so that the third image is not superimposed on the first image.

According to a fourth aspect of the present invention, an image capturing apparatus, equipped with one of a first recording medium and a second recording medium, for capturing a first image of a subject, may include detecting means for detecting whether or not the image capturing apparatus is equipped with the second recording medium, determining means for determining whether or not the image capturing apparatus is equipped with the second recording medium on the basis of the detection result, and display control means for controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the image capturing apparatus is equipped with the second recording medium.

The display control means may control, when the second recording medium is determined to be equipped, displaying of the third image so that the third image is superimposed on the first image.

The second images may include a first icon allowing the user to instruct displaying of a screen that allows a user to select various functions, a second icon allowing the user to instruct activation of a function that is operable by the user when the image capturing apparatus is equipped with the first recording medium, and a third icon allowing the user to instruct activation of a function that is operable by the user when the image capturing apparatus is equipped with the second recording medium. The third image may be the third icon.

The first recording medium may be a memory card, whereas the second recording medium may be a magnetic tape.

According to a fifth aspect of the present invention, an image capturing method for an image capturing apparatus, equipped with one of a first recording medium and a second recording medium, for capturing a first image of a subject, may include the steps of detecting whether or not the image capturing apparatus is equipped with the second recording medium, determining whether or not the image capturing apparatus is equipped with the second recording medium on the basis of the detection result, and controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the image capturing apparatus is equipped with the second recording medium.

According to a sixth aspect of the present invention, a program causes a computer of an image capturing apparatus, equipped with one of a first recording medium and a second recording medium, for capturing a first image of a subject, to perform an image capturing process. The process may include the steps of detecting whether or not the image capturing apparatus is equipped with the second recording medium, determining whether or not the image capturing apparatus is equipped with the second recording medium on the basis of the detection result, and controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the image capturing apparatus is equipped with the second recording medium.

In the fourth, fifth, and sixth aspects of the present invention, whether or not the image capturing apparatus is equipped with the second recording medium is detected. Whether or not the image capturing apparatus is equipped with the second recording medium is determined on the basis of the detection result. When the second recording medium is determined not to be equipped, displaying of a third image allowing the user to instruct activation of a function that is operable by the user when the image capturing apparatus is equipped with the second recording medium among second images allowing the user to instruct activation of various functions is controlled so that the third image is not superimposed on the first image.

According to a seventh aspect of the present invention, a playback apparatus for playing back a first image of a subject may include detecting means for detecting a user's operation for instructing activation of a function, determining means for determining whether or not an instruction of playing back the first image is given on the basis of the detected instruction, and display control means for controlling, when the instruction of playing back the first image is determined to be given, displaying of a third image among second images so that the third image is not superimposed on the first image, the second images allowing the user to instruct activation of various functions, and the third image allowing the user to instruct activation of a function that is not operable by the user during the playback operation.

The display control means may control, when the instruction of playing back the first image is determined not to be given, displaying of the third image so that the third image is superimposed on the first image.

The second images may include a first icon allowing the user to instruct displaying a screen that allows a user to select various functions, a second icon allowing the user to instruct activation of a function that is operable by the user when the playback apparatus is equipped with a first recording medium, and a third icon allowing the user to instruct activation of a function that is operable by the user when the playback apparatus is equipped with a second recording medium. The third image may be one of the second icon and the third icon.

According to an eighth aspect of the present invention, a playback method for a playback apparatus for playing back a first image of a subject may include the steps of detecting a user's operation for instructing activation of a function, determining whether or not an instruction of playing back the first image is given on the basis of the detected instruction, and controlling, when the instruction of playing back the first image is determined to be given, displaying of a third image among second images so that the third image is not superimposed on the first image, the second images allowing the user to instruct activation of various functions, and the third image allowing the user to instruct activation of a function that is not operable by the user during the playback operation.

According to a ninth aspect of the present invention, a program causes a computer of a playback apparatus for playing back a first image of a subject to perform a playback process. The process may include the steps of detecting a user's operation for instructing activation of a function, determining whether or not an instruction of playing back the first image is given on the basis of the detected instruction, and controlling, when the instruction of playing back the first image is determined to be given, displaying of a third image among second images so that the third image is not superimposed on the first image, the second images allowing the user to instruct activation of various functions, and the third image allowing the user to instruct activation of a function that is not operable by the user during the playback operation.

In the seventh, eighth, ninth aspects of the present invention, a user's operation for instructing activation of a function is detected. Whether or not an instruction of playing back the first image is given is determined on the basis of the detected instruction. When the instruction of playing back the first image is determined to be given, displaying of a third image allowing the user to instruct activation of a function that is not operable by the user during the playback operation among second images allowing the user to instruct activation of various functions is controlled so that the third image is not superimposed on the first image.

According to a tenth aspect of the present invention, a playback apparatus for playing back a first image of a subject may include detecting means for detecting a second recording medium among a first recording medium and the second recording medium to be equipped to the playback apparatus, determining means for determining whether or not the playback apparatus is equipped with the second recording medium on the basis of the detection result, and display control means for controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the playback apparatus is equipped with the second recording medium.

The display control means may control, when the second recording medium is determined to be equipped, displaying of the third image so that the third image is superimposed on the first image.

The second images may include a first icon allowing the user to instruct displaying a screen that allows a user to select various functions, a second icon allowing the user to instruct activation of a function that is operable by the user when the playback apparatus is equipped with the first recording medium, and a third icon allowing the user to instruct activation of a function that is operable by the user when the playback apparatus is equipped with the second recording medium. The third image may be the third icon.

The first recording medium may be a memory card, whereas the second recording medium may be a magnetic tape.

According to an eleventh aspect of the present invention, a playback method for a playback apparatus for playing back a first image of a subject may include the steps of detecting a second recording medium among a first recording medium and the second recording medium to be equipped to the playback apparatus, determining whether or not the playback apparatus is equipped with the second recording medium on the basis of the detection result, and controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the playback apparatus is equipped with the second recording medium.

According to a twelfth aspect of the present invention, a program causes a computer of a playback apparatus for playing back a first image of a subject to perform a playback process. The process may include the steps of detecting a second recording medium among a first recording medium and the second recording medium to be equipped to the playback apparatus, determining whether or not the playback apparatus is equipped with the second recording medium on the basis of the detection result, and controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the playback apparatus is equipped with the second recording medium.

In the tenth, eleventh, twelfth aspects of the present invention, a second recording medium among a first recording medium and the second recording medium to be equipped to the playback apparatus is detected. Whether or not the playback apparatus is equipped with the second recording medium is determined on the basis of the detection result. When the second recording medium is determined not to be equipped, displaying of a third image allowing the user to instruct activation of a function that is operable by the user when the playback apparatus is equipped with the second recording medium among second images allowing the user to instruct activation of various functions is controlled so that the third image is not superimposed on the first image.

As mentioned above, the first, second, and third aspects of the present invention can improve the operationality.

The fourth, fifth, and sixth aspects of the present invention can improve the operationality.

The seventh, eighth, and ninth aspects of the present invention can improve the operationality.

The tenth, eleventh, and twelfth aspects of the present invention can improve the operationality.

BRIEF DESCRIPTION OF THE DRAWINGS

FIG. 11 is a flowchart showing a button display operation at the time of power on;

FIG. 12 is a diagram showing an example screen displayed on an LCD panel at the time of power on;

FIG. 13 is a diagram showing an example screen displayed on an LCD panel at the time of power on;

FIG. 14 is a diagram showing an example screen displayed on an LCD panel at the time of power on;

FIG. 15 is a diagram showing an example screen displayed on an LCD panel at the time of power on;

FIG. 20 is a block diagram showing an example of a configuration of a personal computer.

DETAILED DESCRIPTION

Figure 1:
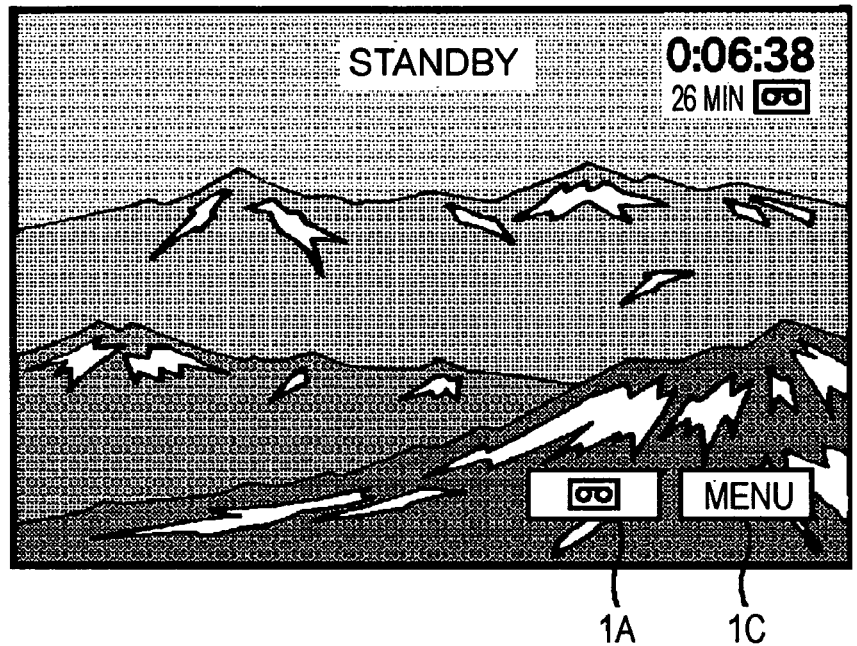
FIG. 1 is a diagram showing an example screen displayed by a known digital video camera.
Figure 2:
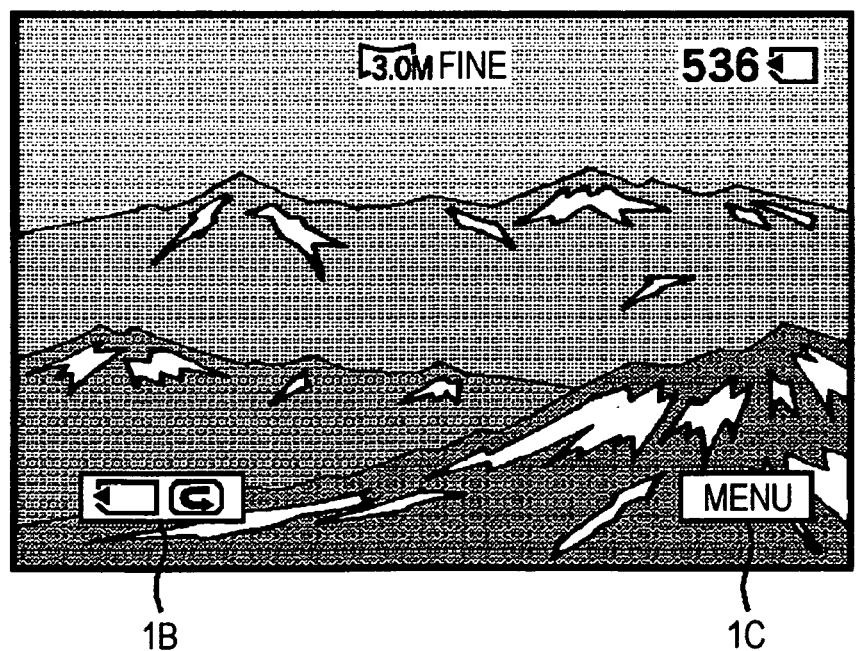
FIG. 2 is a diagram showing an example screen displayed by a known digital video camera.
Figure 3:
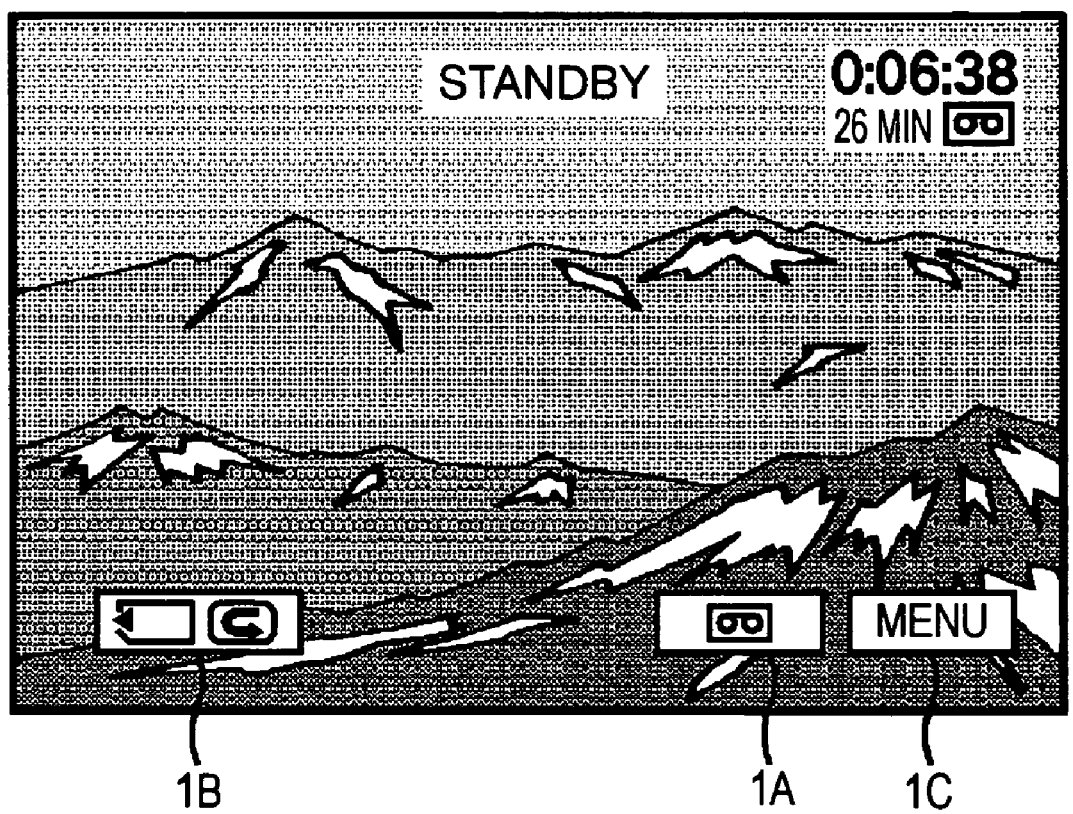
FIG. 3 is a diagram showing an example screen displayed by a known digital video camera.

Before describing embodiments of the present invention, the correspondence between the features of the present invention and the specific elements disclosed in this specification and the accompanying drawings is discussed below. This description is intended to assure that embodiments supporting the claimed invention are described in this specification and the accompanying drawings. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image capturing apparatus (e.g., a digital video camera 11 shown in FIG. 4) according to an aspect of the present invention includes detecting means (e.g., an operation detecting unit 51 shown in FIG. 5) for detecting a user's operation for instructing activation of a function, determining means (e.g., an operation determining unit 52 shown in FIG. 5) for determining whether or not an instruction of capturing the first image is given on the basis of the detected instruction, and display control means (e.g., a display control unit 53 shown in FIG. 5) for controlling, when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

The display control means may control, when the instruction of capturing the first image is determined not to be given, displaying of the third image so that the third image is superimposed on the first image.

The second images may include a first icon (e.g., a button 71C shown in FIG. 7) allowing the user to instruct displaying of a screen (e.g., a menu screen) that allows a user to select various functions, a second icon (e.g., a button 71B shown in FIG. 7) allowing the user to instruct activation of a function that is operable by the user when the image capturing apparatus is equipped with a first recording medium (e.g., a memory card), and a third icon (e.g., a button 71A shown in FIG. 7) allowing the user to instruct activation of a function that is operable by the user when the image capturing apparatus is equipped with a second recording medium (e.g., a magnetic tape). The third image may be one of the second icon and the third icon.

An image capturing method or a program according to another aspect of the present invention includes the steps of detecting (e.g., STEP S14 shown in FIG. 6) a user's operation for instructing activation of a function, determining (e.g., STEP S15 shown in FIG. 6) whether or not an instruction of capturing the first image is given on the basis of the detected instruction, and controlling (e.g., STEP S16 shown in FIG. 6), when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

The program according to the above aspect of the present invention may be recorded on a recording medium (e.g., a removable medium 221 shown in FIG. 20).

An image capturing apparatus according to still another aspect of the present invention includes detecting means (e.g., a recording medium detecting unit 121 shown in FIG. 10) for detecting whether or not the image capturing apparatus is equipped with the second recording medium (e.g., a magnetic tape), determining means (e.g., a recording medium determining unit 122 shown in FIG. 10) for determining whether or not the image capturing apparatus is equipped with the second recording medium on the basis of the detection result, and display control means (e.g., a display control unit 123 shown in FIG. 10) for controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the image capturing apparatus is equipped with the second recording medium.

The display control means may control, when the second recording medium is determined to be equipped, displaying of the third image so that the third image is superimposed on the first image.

The second images may include a first icon (e.g., a button 141C shown in FIG. 14) allowing the user to instruct displaying of a screen (e.g., a menu screen) that allows a user to select various functions, a second icon (e.g., a button 141B shown in FIG. 14) allowing the user to instruct activation of a function that is operable by the user when the image capturing apparatus is equipped with the first recording medium (e.g., a memory card), and a third icon (e.g., a button 141A shown in FIG. 14) allowing the user to instruct activation of a function that is operable by the user when the image capturing apparatus is equipped with the second recording medium (e.g., a magnetic tape). The third image may be the third icon.

The first recording medium may be a memory card, whereas the second recording medium may be a magnetic tape.

An image capturing method or a program according to a further aspect of the present invention includes the steps of detecting (e.g., STEP S71 shown in FIG. 16) whether or not the image capturing apparatus is equipped with the second recording medium (e.g., a magnetic tape), determining (e.g., STEP S72 shown in FIG. 16) whether or not the image capturing apparatus is equipped with the second recording medium on the basis of the detection result, and controlling (e.g., STEP S73 shown in FIG. 16), when the second recording medium is determined not to be equipped, displaying of a third image among second images so that the third image is not superimposed on the first image, the second images allowing the user to instruct activation of various functions, and the third image allowing the user to instruct activation of a function that is operable by the user when the image capturing apparatus is equipped with the second recording medium.

The program according to the above aspect of the present invention may be recorded on a recording medium (e.g., a removable medium 221 shown in FIG. 20).

A playback apparatus (e.g., a digital video camera 11 shown in FIG. 4) according to a still further aspect of the present invention includes detecting means (e.g., an operation detecting unit 51 shown in FIG. 5) for detecting a user's operation for instructing activation of a function, determining means (e.g., an operation determining unit 52 shown in FIG. 5) for determining whether or not an instruction of playing back the first image is given on the basis of the detected instruction, and display control means (e.g., a display control unit 53 shown in FIG. 5) for controlling, when the instruction of playing back the first image is determined to be given, displaying of a third image among second images so that the third image is not superimposed on the first image, the second images allowing the user to instruct activation of various functions, and the third image allowing the user to instruct activation of a function that is not operable by the user during the playback operation.

The display control means may control, when the instruction of playing back the first image is determined not to be given, displaying of the third image so that the third image is superimposed on the first image.

The second images may include a first icon (e.g., a button 71C shown in FIG. 7) allowing the user to instruct displaying a screen (e.g., a menu screen) that allows a user to select various functions, a second icon (e.g., a button 71B shown in FIG. 7) allowing the user to instruct activation of a function that is operable by the user when the playback apparatus is equipped with a first recording medium (e.g., a memory card), and a third icon (e.g., a button 71A shown in FIG. 7) allowing the user to instruct activation of a function that is operable by the user when the playback apparatus is equipped with a second recording medium (e.g., a magnetic tape). The third image may be one of the second icon and the third icon.

A playback method or a program according to another aspect of the present invention includes the steps of detecting (e.g., STEP S14 shown in FIG. 6) a user's operation for instructing activation of a function, determining (e.g., STEP S15 shown in FIG. 6) whether or not an instruction of playing back the first image is given on the basis of the detected instruction, and controlling (e.g., STEP S16 shown in FIG. 6), when the instruction of playing back the first image is determined to be given, displaying of a third image among second images so that the third image is not superimposed on the first image, the second images allowing the user to instruct activation of various functions, and the third image allowing the user to instruct activation of a function that is not operable by the user during the playback operation.

The program according to the above aspect of the present invention may be recorded on a recording medium (e.g., a removable medium 221 shown in FIG. 20).

A playback apparatus according to still another aspect of the present invention includes detecting means (e.g., a recording medium detecting unit 121 shown in FIG. 10) for detecting a second recording medium among a first recording medium (e.g., a memory card) and the second recording medium (e.g., a magnetic tape) to be equipped to the playback apparatus, determining means (e.g., a recording medium determining unit 122 shown in FIG. 10) for determining whether or not the playback apparatus is equipped with the second recording medium on the basis of the detection result, and display control means (e.g., a display control unit 123 shown in FIG. 10) for controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the playback apparatus is equipped with the second recording medium.

The display control means may control, when the second recording medium is determined to be equipped, displaying of the third image so that the third image is superimposed on the first image.

The second images may include a first icon (e.g., a button 141C shown in FIG. 14) allowing the user to instruct displaying a screen (e.g., a menu screen) that allows a user to select various functions, a second icon (e.g., a button 141B shown in FIG. 14) allowing the user to instruct activation of a function that is operable by the user when the playback apparatus is equipped with the first recording medium (e.g., a memory card), and a third icon (e.g., a button 141A shown in FIG. 14) allowing the user to instruct activation of a function that is operable by the user when the playback apparatus is equipped with the second recording medium (e.g., a magnetic tape). The third image may be the third icon.

The first recording medium may be a memory card, whereas the second recording medium may be a magnetic tape.

A playback method or a program according to a further aspect of the present invention includes the steps of detecting (e.g., STEP S71 shown in FIG. 16) a second recording medium among a first recording medium (e.g., a memory card) and the second recording medium (e.g., a magnetic tape) to be equipped to the playback apparatus, determining (e.g., STEP S72 shown in FIG. 16) whether or not the playback apparatus is equipped with the second recording medium on the basis of the detection result, and controlling (e.g., STEP S73 shown in FIG. 16), when the second recording medium is determined not to be equipped, displaying of a third image among second images so that the third image is not superimposed on the first image, the second images allowing the user to instruct activation of various functions, and the third image allowing the user to instruct activation of a function that is operable by the user when the playback apparatus is equipped with the second recording medium.

The program according to the above aspect of the present invention may be recorded on a recording medium (e.g., a removable medium 221 shown in FIG. 20).

Embodiments of the present invention will be described below with reference to the accompanying drawings.

Figure 4:
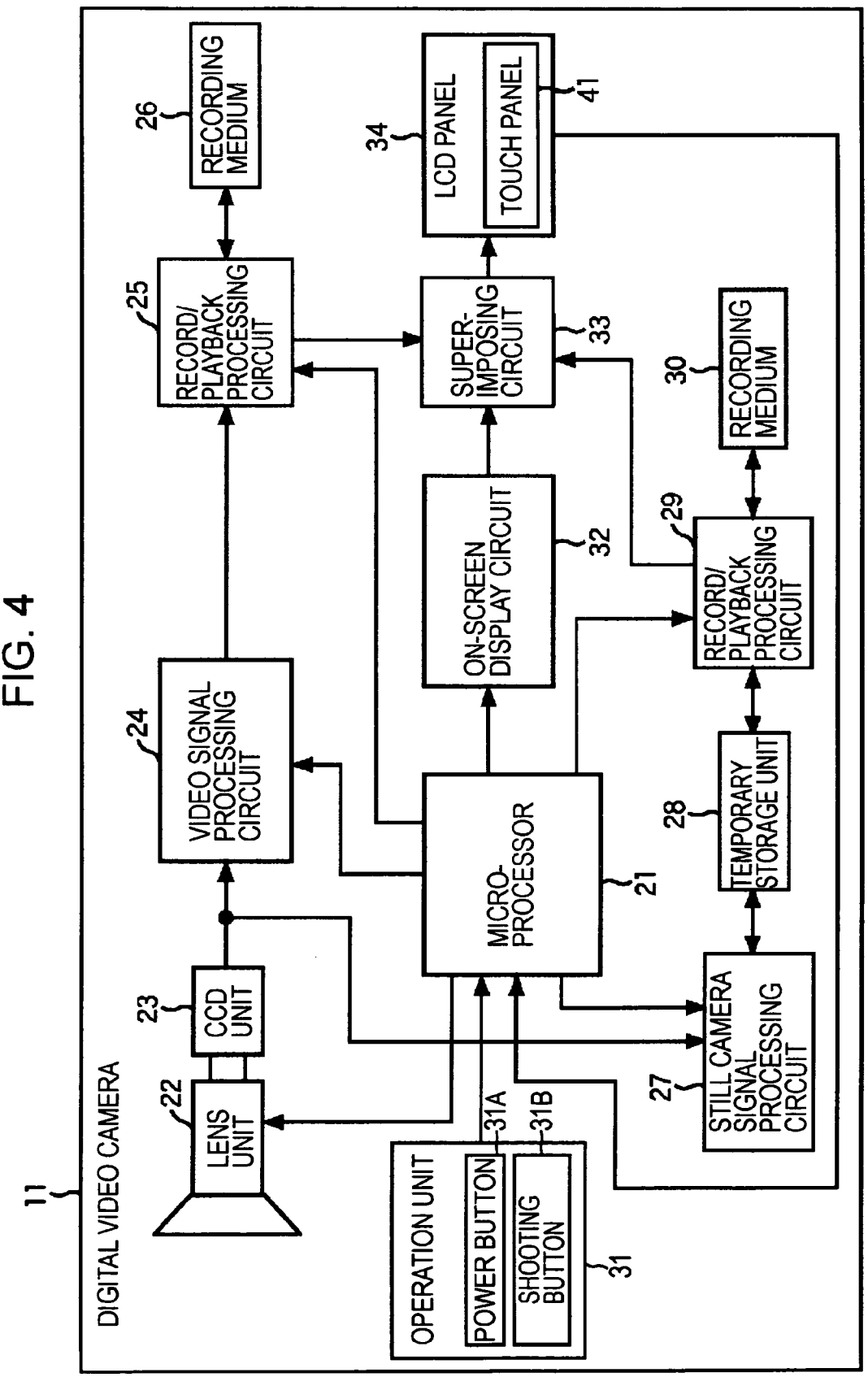
FIG. 4 is a block diagram showing an example of a configuration of a digital video camera according to an embodiment of the present invention.

FIG. 4 is a block diagram showing an example of a configuration of a digital video camera 11 according to an embodiment of the present invention.

The digital video camera 11 is only an example of an image capturing apparatus or a playback apparatus that includes a touch panel therein. Although embodiments are described herein for the digital video camera 11 for example, the embodiments are not limited to this particular example, and can be applied to apparatuses such as, for example, a digital still camera, a mobile phone, a PDA (Personal Digital Assistance), and a PHS (Personal Handyphone System), that include a touch panel therein.

The digital video camera 11 has a microprocessor 21, a lens unit 22, a CCD (Charge Coupled Device) unit 23, a video signal processing circuit 24, a record/playback processing circuit 25, a still camera signal processing circuit 27, a temporary storage unit 28, a record/playback processing circuit 29, an operation unit 31, an on-screen display circuit 32, a superimposing circuit 33, and an LCD (Liquid Crystal Display) panel 34. In addition, the digital video camera 11 is equipped with two types of recording medium, e.g., recording media 26 and 30, if necessary.

The microprocessor 21 controls each unit in the digital video camera 11. More specifically, the microprocessor 21 controls the lens unit 22, the video signal processing circuit 24, the record/playback processing circuit 25, the still camera signal processing circuit 27, the record/playback processing circuit 29, and the on-screen display circuit 32, for example.

The lens unit 22 collects light (image) reflected from a subject, and forms an optical image of the subject on a light receiving surface of the CCD unit 23. In addition, the microprocessor 21 drives the lens unit 22.

The CCD unit 23 includes CCD sensors, and converts the optical image formed by the lens unit 22 into an analog electric signal by photoelectric conversion. The CCD unit 23 supplies the converted analog image signal to the video signal processing circuit 24 or the still camera signal processing circuit 27.

The digital video camera 11 can record both movies and still images. Thus, the CCD unit 23, for example, supplies the analog image signal to the video signal processing circuit 24 to record movies, whereas the CCD unit 23 supplies the analog image signal to the still camera signal processing circuit 27 to record still images.

The CCD unit 23 is not necessary constituted by CCD sensors. The CCD unit 23 may be constituted by imaging devices, such as CMOS (Complementary Metal Oxide Semiconductor) sensors, that generate image signals on a pixel-by-pixel basis.

The video signal processing circuit 24 includes a DSP (Digital Signal Processor), for example. The video signal processing circuit 24 converts the analog image signal supplied from the CCD unit 23 into digital image data under the control of the microprocessor 21. Under the control of the microprocessor 21, the video signal processing circuit 24 then performs predetermined processing on the converted digital image data, and supplies the processed image data to the record/playback processing circuit 25.

Here, the video signal processing circuit 24 performs the predetermined processing, such as correction of degradation that occurred at the lens unit 22 and the CCD unit 23, white balance control, gamma correction, resolution change, compression/decompression, or JPEG (Joint Photographic Experts Group) format encoding, on the image data. The video signal processing circuit 24 does not necessarily perform all the predetermined processing, and the record/playback processing circuit 25, described below, may perform part of the processing.

To record the image data on the recording medium 26, the record/playback processing circuit 25 converts the image data supplied by the video signal processing circuit 24 into a format suitable for recording the data on the recording medium 26. The record/playback processing circuit 25 then supplies and records the converted data on the recording medium 26. The recording medium 26 may be, for example, a magnetic tape (simply, a tape) or a DVD (Digital Versatile Disc). The digital video camera 11 is equipped with the recording medium 26, if necessary. In addition, the recording medium 26 may be the same type as the recording medium 30, which is described below. Additionally, the recording medium 26 may be a storage device, such as a hard disk drive.

In addition, to playback image data recorded on the recording medium 26, the record/playback processing circuit 25 converts the image data read out from the recording medium 26 into a format suitable for displaying images on the LCD panel 34. The record/playback processing circuit 25 then supplies the converted data to the superimposing circuit 33. Image data to be displayed on a screen of the LCD panel 34 is superimposed on the image data supplied from the record/playback processing circuit 25 by the superimposing circuit 33. The image data to be displayed on the screen of the LCD panel 34 may be of various buttons (e.g., icons), and is supplied by the on-screen display circuit 32. The superimposing circuit 33 then supplies the superimposed image data to the LCD panel 34 so as to display an image on the LCD panel 34.

The still camera signal processing circuit 27 includes a DSP, for example. The still camera signal processing circuit 27 converts the analog image signal supplied from the CCD unit 23 into digital image data under the control of the microprocessor 21. The still camera signal processing circuit 27 then performs predetermined processing on the converted digital image data under the control of the microprocessor 21, and supplies the processed image data to the temporary storage unit 28 to store the data therein.

Here, the still camera signal processing circuit 27, like the video signal processing circuit 24, performs the predetermined processing such as correction, for example. The still camera signal processing circuit 27 does not necessarily perform all the predetermined processing, and the record/playback processing circuit 29, described below, may perform part of the processing.

To record the image data on the recording medium 30, the record/playback processing circuit 29 converts the image data, which is read out from the temporary storage unit 28 and is originally supplied by the still camera signal processing circuit 27, into a format suitable for recording the data on the recording medium 30. The record/playback processing circuit 29 then supplies and records the converted data on the recording medium 30. The recording medium 30 may be, for example, a memory card such as a memory stick (TM). The digital video camera 11 is equipped with the recording medium 30, if necessary. In addition, the recording medium 30 may be the same type as the recording medium 26.

In addition, to play back image data recorded on the recording medium 30, the record/playback processing circuit 29 converts the image data read out from the recording medium 30 into a format suitable for displaying images on the LCD panel 34. The record/playback processing circuit 29 then supplies the converted data to the superimposing circuit 33. Image data corresponding to images to be displayed on the screen of the LCD panel 34 is superimposed on the image data supplied from the record/playback processing circuit 29 by the superimposing circuit 33. The image data to be displayed on the screen of the LCD panel 34 may be of various buttons (e.g., icons), and is supplied by the on-screen display circuit 32. The superimposing circuit 33 then supplies the superimposed image data to the LCD panel 34 so as to display the image on the LCD panel 34.

The operation unit 31 supplies signals corresponding to user operations (hereinafter, referred to as "user operation signals") to the microprocessor 21. The operation unit 31 includes a power button 31A and a shooting button 31B. Users operate the power button 31A to turn on or turn off the digital video camera 11, for example. Users operate the shooting button 31B to start or stop a shooting operation, for example.

The microprocessor 21 performs various operations on the basis of the user operation signals supplied from the operation unit 31. For example, in response to a user operation signal instructing power on supplied from the operation unit 31 (i.e., the power button 31A), the microprocessor 21 controls the on-screen display circuit 32 to supply the image data to the superimposing circuit 33. The image data may be of buttons (e.g., icons) to be displayed on the LCD panel 34 when the digital video camera 11 is turned on.

The image data of various buttons (e.g., icons) supplied from the on-screen display circuit 32 is superimposed on the image data supplied from the record/playback processing circuit 25 or 29 by the superimposing circuit 33. The superimposing circuit 33 then supplies the superimposed image data to the LCD panel 34 so as to display the image on the LCD panel 34.

The LCD panel 34 displays images corresponding to the image data supplied from the superimposing circuit 33. Accordingly, an image corresponding to image data of an optical image of a subject formed on the light receiving surface of the CCD unit 23 by the lens unit 22 is displayed on the screen of the LCD panel 34.

The LCD panel 34 includes a touch panel 41. The touch panel 41 is placed on the LCD panel 34, such that the images displayed on the LCD panel 34 can be seen through the touch panel 41. The touch panel 41 receives user operations of selecting one of a plurality of buttons (e.g., icons) in an operation screen displayed on the LCD panel 34. The touch panel 41 then supplies signals of information regarding positions a user has touched (hereinafter, referred to as "panel operation signals") to the microprocessor 21.

The microprocessor 21 performs various operations on the basis of the panel operation signals supplied from the touch panel 41. For example, in response to a panel operation signal instructing viewing of a movie (or a still image) recorded on the recording medium 26, the microprocessor 21 controls the record/playback processing circuit 25 and the on-screen display circuit 32 to display the movie (or the still image) recorded on the recording medium 26 on the screen of the LCD panel 34.

Although not shown in FIG. 4, the digital video camera 11 also includes a circuit that performs predetermined processing on audio signals captured with a microphone. The processed audio data is then recorded on, for example, the recording medium 26.

Figure 5:
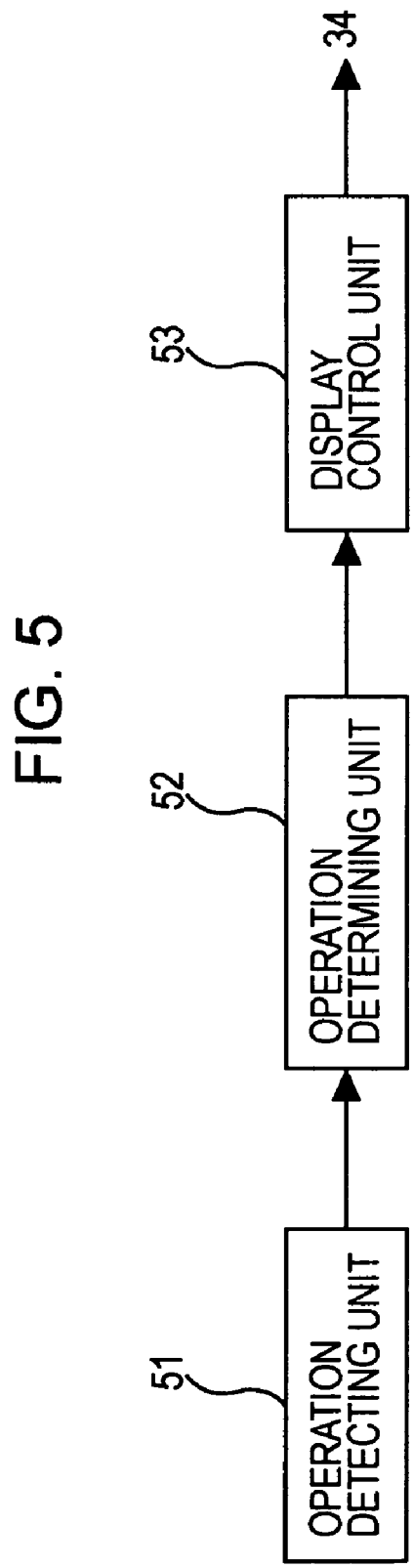
FIG. 5 is a block diagram showing an example of a functional configuration of a digital video camera shown in FIG. 4.

FIG. 5 is a block diagram showing an example of a functional configuration of the digital video camera 11 shown in FIG. 4.

The digital video camera 11 includes an operation detecting unit 51, an operation determining unit 52, and a display control unit 53.

According to the embodiment of the present invention, the digital video camera 11 has the above-described hardware configuration shown in FIG. 4. Thus, the operation detecting unit 51, the operation determining unit 52, and the display control unit 53 are implemented by software (i.e., programs) executed by, for example, the microprocessor 21 shown in FIG. 4. However, by configuring the hardware of the digital video camera 11 in a different manner from that shown in FIG. 4, the operation detecting unit 51, the operation determining unit 52, or the display control unit 53 can be also implemented by hardware or a combination of hardware and software.

The operation detecting unit 51 detects user operations performed on the operation unit 31 (e.g., the power button 31A and the shooting button 31B) on the basis of the user operation signals supplied from the operation unit 31. The operation detecting unit 51 then supplies the detection result to the operation determining unit 52.

The operation determining unit 52 determines whether or not various operations are performed on the basis of the detection result supplied from the operation detecting unit 51. The various operations include, for example, power on, power off, start of a shooting operation, and stop of a shooting operation. The operation determining unit 52 then supplies the determination result to the display control unit 53.

The display control unit 53 controls the LCD panel 34 on the basis of the determination result supplied from the operation determining unit 52 so as to display predetermined images. The predetermined images correspond to image data obtained by superimposing the image data of various buttons (e.g., icons, such as buttons 71A to 71C described below) and captured image data of a subject.

Now, an action of the digital video camera 11 will be described. For example, to use the digital video camera 11, a user presses the power button 31A so as to turn on the digital video camera 11. The user then presses the shooting button 31B, and starts shooting a subject. In addition, to stop using the digital video camera 11, the user presses the shooting button 31B. The user then presses the power button 31A so as to turn off the digital video camera 11. In the description below, for ease of explanation, the shooting button 31B is pressed again to stop the shooting operation. However, a shooting stop button may be provided separately from the shooting button 31B.

Referring to a flowchart shown in FIG. 6, an example button display operation during a shooting operation, i.e., an operation from power on to power off of digital video camera 11 performed by a user at the time of the shooting operation, will be described.

Figure 6:
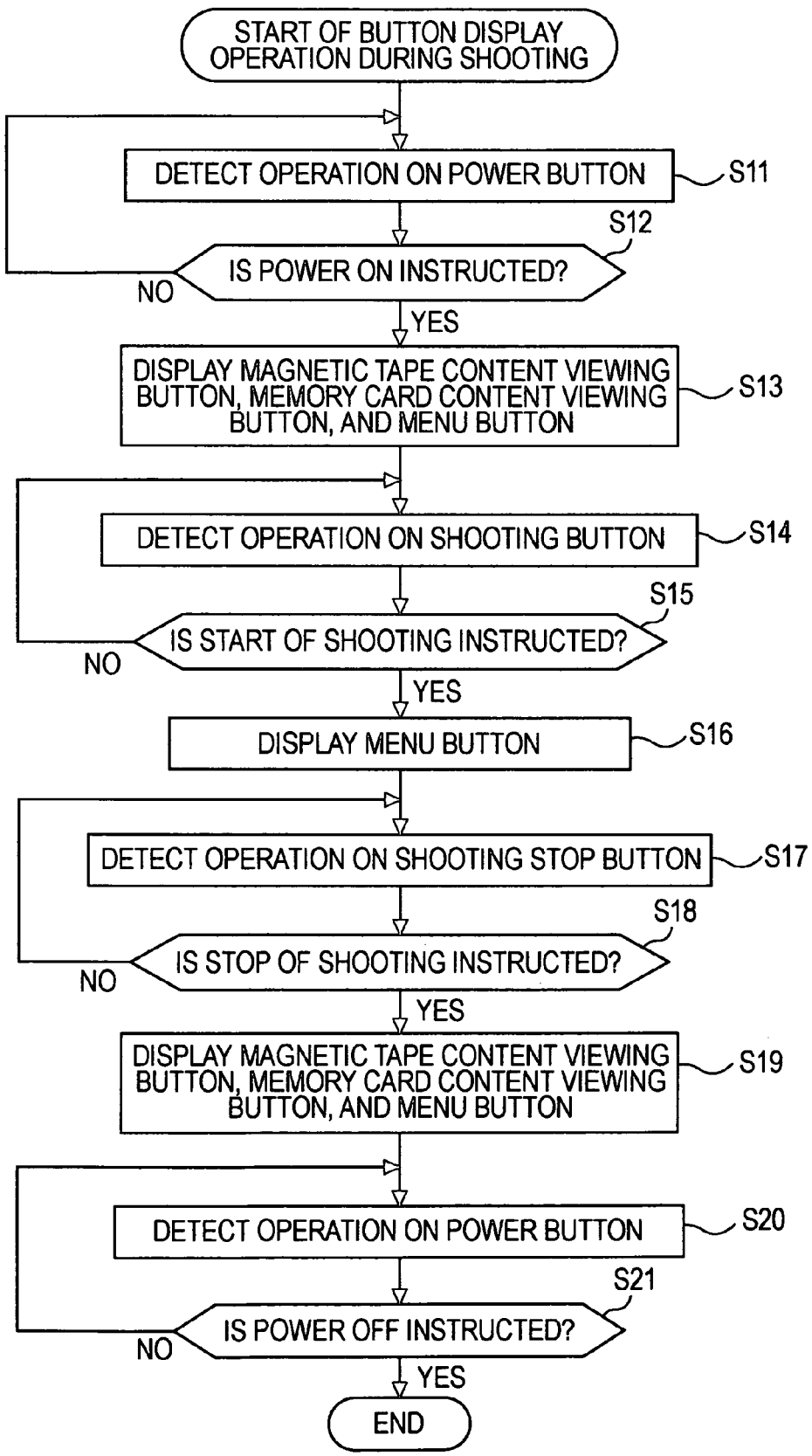
FIG. 6 is a flowchart showing a button display operation during a shooting operation.

In response to a predetermined operation performed on the operation unit 31 by a user, the microprocessor 21 causes each unit to perform the steps of the flowchart shown in FIG. 6. At this time, suppose that the digital video camera 11 is equipped with a magnetic tape and a memory card, i.e., the recording media 26 and 30, respectively.

At STEP S11, the operation detecting unit 51 detects the operation performed on the power button 31A by a user, and supplies the detection result to the operation determining unit 52.

At STEP S12, the operation determining unit 52 determines whether or not powering on of the digital video camera 11 is instructed on the basis of the detection result supplied from the operation detecting unit 51.

At STEP S12, if the operation determining unit 52 determines that the powering on is not instructed, the process returns to STEP S11, and the above-described step is repeated. More specifically, the digital video camera 11 does not work until the user turns on the digital video camera 11.

On the other hand, at STEP S12, if the operation determining unit 52 determines that the powering on is instructed, the process proceeds to STEP S13. At STEP S13, on the basis of the determination result supplied from the operation determining unit 52, the display control unit 53 causes the LCD panel 34 to display a predetermined image to be displayed at the time of power on (i.e., an image displayed at times except for during the shooting operation).

Figure 7:
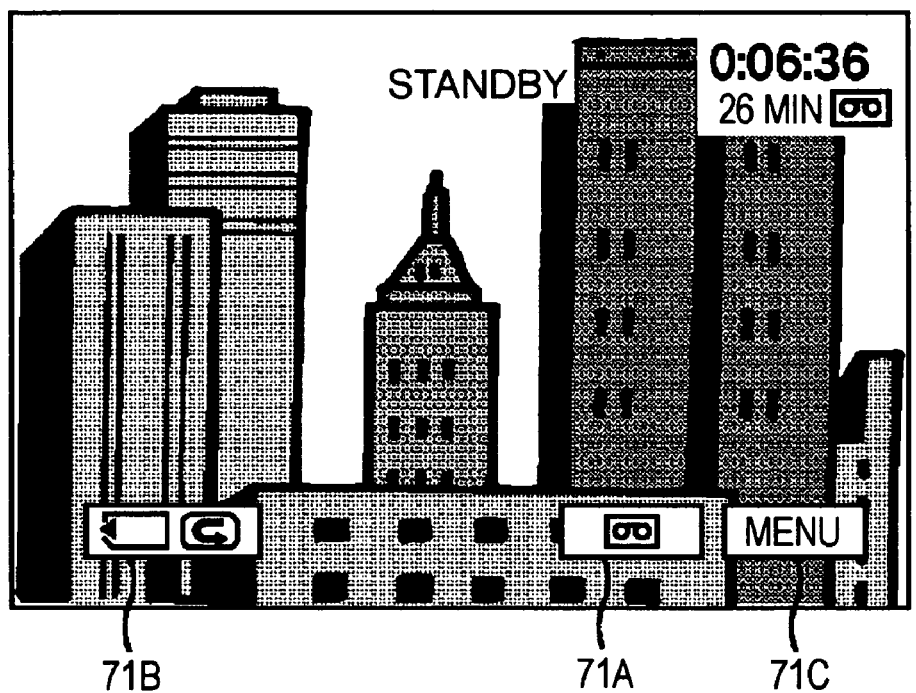
FIG. 7 is a diagram showing an example screen displayed on an LCD panel at times except for a shooting operation.

For example, at STEP S13, the display control unit 53 displays an image shown in FIG. 7 on the LCD panel 34 on the basis of the determination result supplied from the operation determining unit 52. In the image displayed on the LCD panel 34, images of buttons 71A, 71B, and 71C are superimposed on an image of a subject. The operation of the button 71A allows the user to view movies (or still images) recorded on the magnetic tape. The operation of the button 71B allows the user to view still images (or movies) recorded on the memory card. The operation of the button 71C allows the user to display a menu screen having selectable operation items listed thereon.

Suppose that the digital video camera 11 is equipped with the magnetic tape and the memory card when the digital video camera 11 is turned on and the shooting operation is not started. At this time, functions of viewing movies recorded on the magnetic tape, of viewing still images recorded on the memory card, and of displaying a menu screen are available (or operable by the user). Thus, buttons 71A to 71C for these functions are displayed on the LCD panel 34.

Referring back to the flowchart shown in FIG. 6, at STEP S14, the operation detecting unit 51 detects the operation performed on the shooting button 31B by the user, and supplies the detection result to the operation determining unit 52.

At STEP S15, the operation determining unit 52 determines whether or not starting of a shooting operation is instructed on the basis of the detection result supplied from the operation detecting unit 51.

At STEP S15, if the operation determining unit 52 determines that starting of the shooting operation is not instructed, the process returns to STEP S14, and the above-described step is repeated. More specifically, the digital video camera 11 remains in the power on state and stands by until the user presses the shooting button 31B.

On the other hand, at STEP S15, if the operation determining unit 52 determines that starting of the shooting operation is instructed, the process proceeds to STEP S16. At STEP S16, on the basis of the determination result supplied from the operation determining unit 52, the display control unit 53 causes the LCD panel 34 to display a predetermined image to be displayed during the shooting operation.

Figure 8:
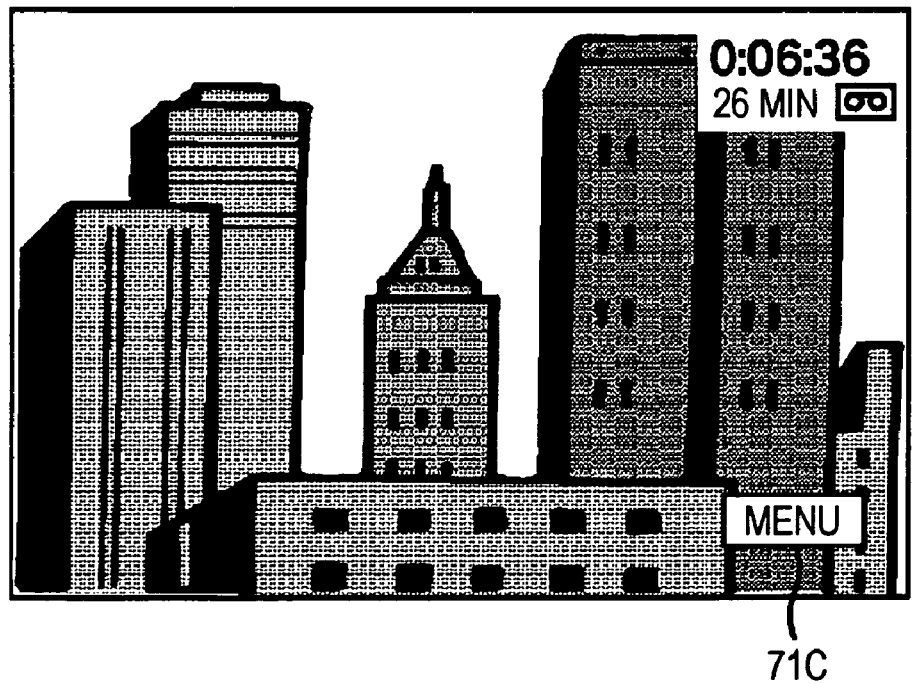
FIG. 8 is a diagram showing an example screen displayed on an LCD panel during a shooting operation.

For example, at STEP S16, the display control unit 53 causes the LCD panel 34 to display an image shown in FIG. 8 on the basis of the determination result supplied from the operation determining unit 52. In the image, the image of the button 71C is superimposed on the image of the subject.

More specifically, when the digital video camera 11 is turned on and the shooting operation has been started, functions of viewing movies recorded on the magnetic tape and of viewing still images recorded on the memory card are not available (or are not operable by the user) during the shooting operation, and a function of displaying the menu screen is available (or is operable by the user) during the shooting operation. Thus, only the button 71C for displaying the menu screen is displayed on the LCD panel 34.

Accordingly, regardless of the types of recording medium equipped to the digital video camera 11 or a current recording mode, the digital video camera 11 displays buttons for functions available during the shooting operation and does not display those not available during the shooting operation. This can reduce the degree to which the image of the subject is obscured by the buttons during the shooting operation.

Now, referring back to the flowchart shown in FIG. 6, at STEP S17, the operation detecting unit 51 detects the operation performed on the shooting button 31B (or a shooting stop button) by the user, and supplies the detection result to the operation determining unit 52.

At STEP S18, the operation determining unit 52 determines whether or not stopping of the shooting operation is instructed on the basis of the detection result supplied from the operation detecting unit 51.

At STEP S18, if the operation determining unit 52 determines that stopping of the shooting operation is not instructed, the process returns to STEP S17, and the above-described step is repeated. More specifically, the digital video camera 11 continues the shooting operation until the user presses the shooting button 31B (or the shooting stop button) again.

On the other hand, at STEP S18, if the operation determining unit 52 determines that stopping of the shooting operation is instructed, the process proceeds to STEP S19. At STEP S19, on the basis of the determination result supplied from the operation determining unit 52, the display control unit 53 causes the LCD panel 34 to display a predetermined image to be displayed when the shooting operation is stopped (i.e., the image to be displayed when the shooting operation is not performed).

For example, at STEP S19, on the basis of the determination result supplied from the operation determining unit 52, the display control unit 53 causes the LCD panel 34 to display the above-mentioned image shown in FIG. 7. In the image, the images of the buttons 71A to 71C are superimposed on the image of the subject.

Suppose that the digital video camera 11 is equipped with the magnetic tape and the memory card when the digital video camera 11 is turned on and the shooting operation is stopped. At this time, functions of viewing movies recorded on the magnetic tape, of viewing still images recorded on the memory card, and of displaying a menu screen are available (or operable by the user). Thus, the buttons 71A to 71C for these functions are displayed on the LCD panel 34.

Referring back again to the flowchart shown in FIG. 6, at STEP S20, the operation detecting unit 51 detects the operation performed on the power button 31A by a user, and supplies the detection result to the operation determining unit 52.

At STEP S21, the operation determining unit 52 determines whether or not powering off is instructed on the basis of the detection result supplied from the operation detecting unit 51.

At STEP S21, if the operation determining unit 52 determines that powering off is not instructed, the process returns to STEP S20, and the above-described step is repeated. More specifically, the digital video camera 11 remains in the power on state and stands by until the user presses the power button 31A again.

On the other hand, at STEP S21, if the operation determining unit 52 determines that powering off is instructed, the digital video camera 11 is turned off. Accordingly, the digital video camera 11 finishes the button display operation.

As described above, regardless of the types of the equipped recording media (e.g., the magnetic tape or the memory card) or the current recording mode (e.g., the magnetic tape recording mode or the memory card recording mode), the digital video camera 11 can change the buttons displayed on the LCD panel 34.

More specifically, regardless of the types of the equipped recording media or the current recording mode, the digital video camera 11 does not display the buttons for functions not available during the shooting operation. Thus, unnecessary buttons are not displayed on the screen of the LCD panel 34, which is originally used for confirming the image to be shot, thus preventing the image to be shot from being obscured by the buttons. As a result, the possibility that the image to be shot is obscured by the buttons is decreased, and the user can shoot the image while sufficiently confirming the image.

In the example describe above, the button 71C is displayed on the LCD panel 34 during the shooting operation, whereas the buttons 71A to 71C are displayed on the LCD panel 34 at times except for the shooting operation. However, the present invention is not limited to this particular example.

More specifically, although the buttons 71A and 71B are assigned for the functions that are not available during the shooting operation and that are relating to the magnetic tape and the memory card, these buttons can be assigned for other functions not available during the shooting operation. In addition, although the button 71C is assigned for the function that is available during the shooting operation and that for displaying the menu screen, this button can also be assigned for another function available during the shooting operation.

Additionally, the button 71A is described as an example of a button for the function relating to the magnetic tape. In the embodiment, the button 71A may be a button for one of various functions relating to the magnetic tape. Here, the various functions include deletion of movies (or still images) recorded on the magnetic tape, changing of a recording format or a size of movies (or still images) to be shot, and shooting of movies (or still images). Likewise, the button 71B is described as an example of a button for the function relating to the memory card. In the embodiment, the button 71B may be a button for one of various functions relating to the memory card. Here, the various functions include deletion of still images (or movies) recorded on the memory card, changing of a recording format or a size of still images (or movies) to be shot, and shooting of still images (or movies).

The digital video camera 11 displays the buttons for the functions available during the shooting operation and does not display those for functions not available during the shooting operation. Thus, the buttons may be assigned for any functions as long as these conditions are satisfied.

Users of a digital video camera capable of being equipped with a plurality of recording media may have a recording medium to use and a recording medium not to use. Thus, a method of changing displaying of buttons on the basis of whether or not the digital video camera is equipped with recording media will be described below.

Figure 9:
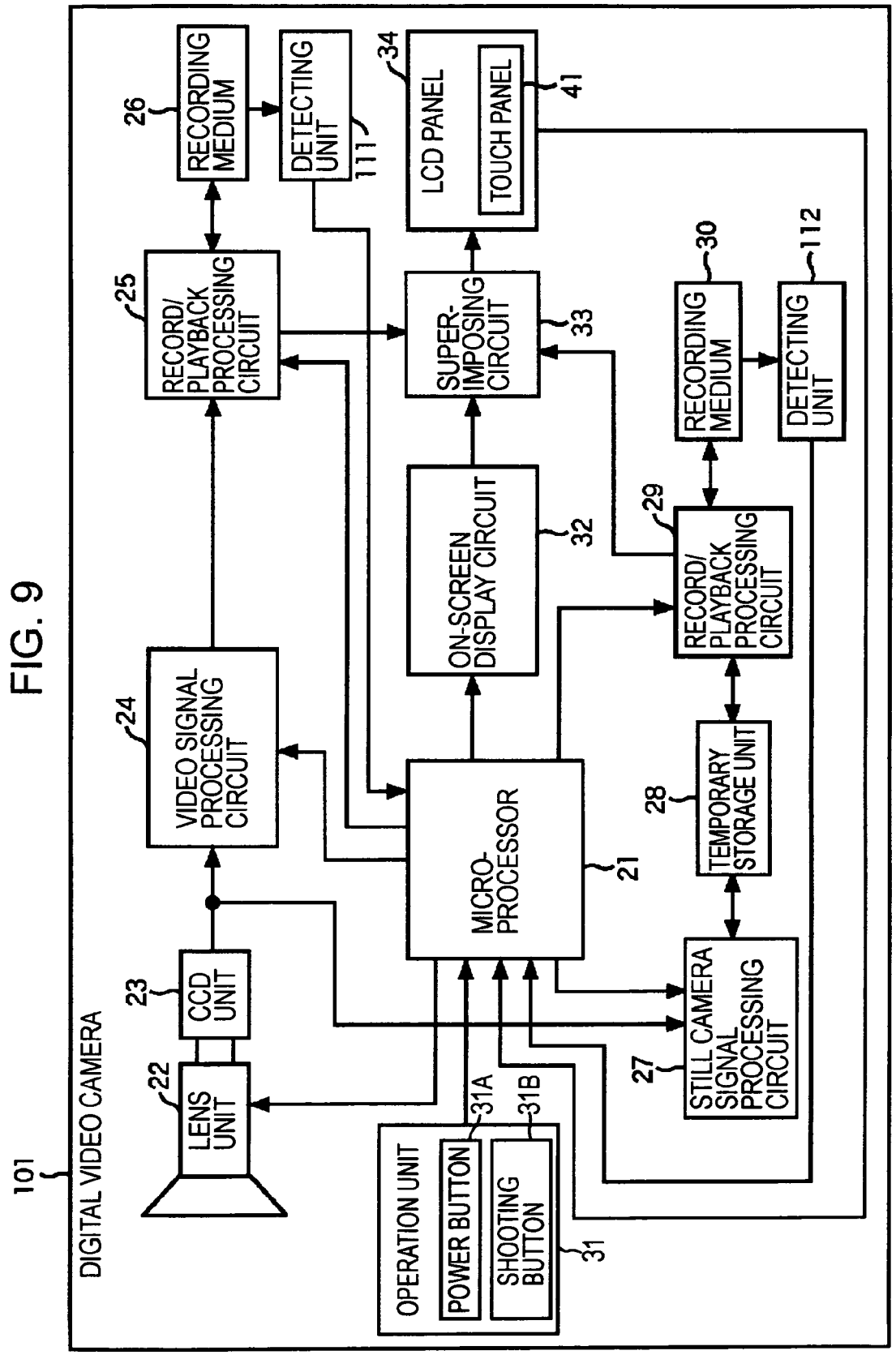
FIG. 9 is a block diagram showing another example of a configuration of a digital video camera according to an embodiment of the present invention.

FIG. 9 is a block diagram showing an example of a configuration of a digital video camera 101 according to an embodiment of the present invention.

In FIG. 9, the same reference numerals as those shown in FIG. 4 have been used to indicate corresponding units, thus description of those units is omitted here. More specifically, the digital video camera 101 shown in FIG. 9 has detecting units 111 and 112 in addition to the units of digital video camera 11 shown in FIG. 4.

The detecting unit 111 includes a sensor or the like for detecting equipment of a recording medium 26, for example. As soon as the digital video camera 101 is equipped with the recording medium 26, the detecting unit 111 supplies a signal informing equipment of the recording medium 26 (hereinafter, referred to as "a first equipment signal") to a microprocessor 21.

The microprocessor 21 performs various operations on the basis of the first equipment signal supplied by the detecting unit 111. For example, upon receiving the first equipment signal from the detecting unit 111, the microprocessor 21 controls an on-screen display circuit 32 to supply a superimposing circuit 33 image data of buttons (e.g., icons) to be displayed on an LCD panel 34 when the digital video camera 101 is equipped with the recording medium 26.

The detecting unit 112, like the detecting unit 111, includes a sensor or the like for detecting a recording medium 30. As soon as the digital video camera 101 is equipped with the recording medium 30, the detecting unit 112 supplies a signal informing equipment of the recording medium 30 (hereinafter, referred to as "a second equipment signal") to the microprocessor 21.

The microprocessor 21 performs various operations on the basis of the second equipment signal supplied by the detecting unit 112. For example, upon receiving the second equipment signal from the detecting unit 112, the microprocessor 21 controls the on-screen display circuit 32 to supply the superimposing circuit 33 image data of buttons (e.g., icons) to be displayed on the LCD panel 34 when the digital video camera 101 is equipped with the recording medium 30.

Figure 10:
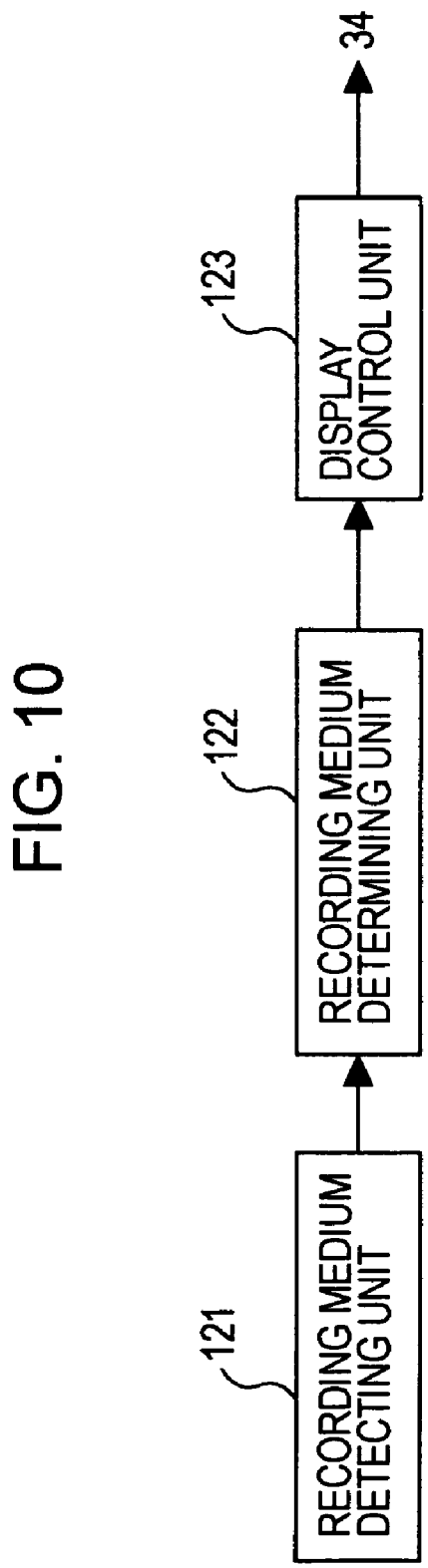
FIG. 10 is a block diagram showing an example of a functional configuration of a digital video camera shown in FIG. 9.

FIG. 10 is a block diagram of an example of a functional configuration of the digital video camera 101 shown in FIG. 9.

The digital video camera 101 includes a recording medium detecting unit 121, a recording medium determining unit 122, and a display control unit 123.

According to the embodiment of the present invention, the digital video camera 101 has the above-described hardware configuration shown in FIG. 9. Thus, the recording medium detecting unit 121, the recording medium determining unit 122, and the display control unit 123 are implemented by software (i.e., programs) executed by, for example, the microprocessor 21 shown in FIG. 9. However, by configuring the hardware of the digital video camera 101 in a different manner from that shown in FIG. 9, the recording medium detecting unit 121, the recording medium determining unit 122, or the display control unit 123 can also be implemented by hardware or a combination of hardware and software.

The recording medium detecting unit 121 detects equipment of the recording medium 26 on the basis of the first equipment signal supplied from the detecting unit 111. The recording medium detecting unit 121 also detects equipment of the recording medium 30 on the basis of the second equipment signal supplied from the detecting unit 112. The recording medium detecting unit 121 then supplies the detection result to the recording medium determining unit 122.

The recording medium determining unit 122 determines whether or not the recording medium 26 or 30 is removed from the digital video camera 101 on the basis of the detection result supplied from the recording medium detecting unit 121. The recording medium determining unit 122 determines whether or not the digital video camera 101 is equipped with the recording medium 26 or 30 on the basis of the detection result supplied from the recording medium detecting unit 121. The recording medium determining unit 122 then supplies the determination result to the display control unit 123.

The display control unit 123 controls the LCD panel 34 on the basis of the determination result supplied from the recording medium determining unit 122 so as to display predetermined images. The predetermined images correspond to image data obtained by superimposing the image data of various buttons (e.g., icons, such as buttons 141A to 141C described below) and captured image data of a subject.

Now, an action of the digital video camera 101 will be described. For example, to use the digital video camera 101, a user presses a power button 31A so as to turn on the digital video camera 101. Upon receiving an instruction of power on from a user through the power button 31A, the microprocessor 21 causes each unit of the digital video camera 101 to perform a button display operation at the time of power on shown in a flowchart of FIG. 11.

The digital video camera 101 is equipped with a magnetic tape and a memory card as the recording medium 26 and the recording medium 30, respectively, if necessary.

At STEP S51, the recording medium detecting unit 121 detects equipment of the magnetic tape, and supplies the detection result to the recording medium determining unit 122.

At STEP S52, the recording medium determining unit 122 determines whether or not the digital video camera 101 is equipped with the magnetic tape on the basis of the detection result supplied from the recording medium detecting unit 121.

At STEP S52, if the recording medium determining unit 122 determines that the digital video camera 101 is equipped with the magnetic tape, the process proceeds to STEP S53. At STEP S53, the display control unit 123 displays a predetermined screen to be displayed when the magnetic tape is equipped on the LCD panel 34 on the basis of the determination result supplied from the recording medium determining unit 122.

Figure 12:
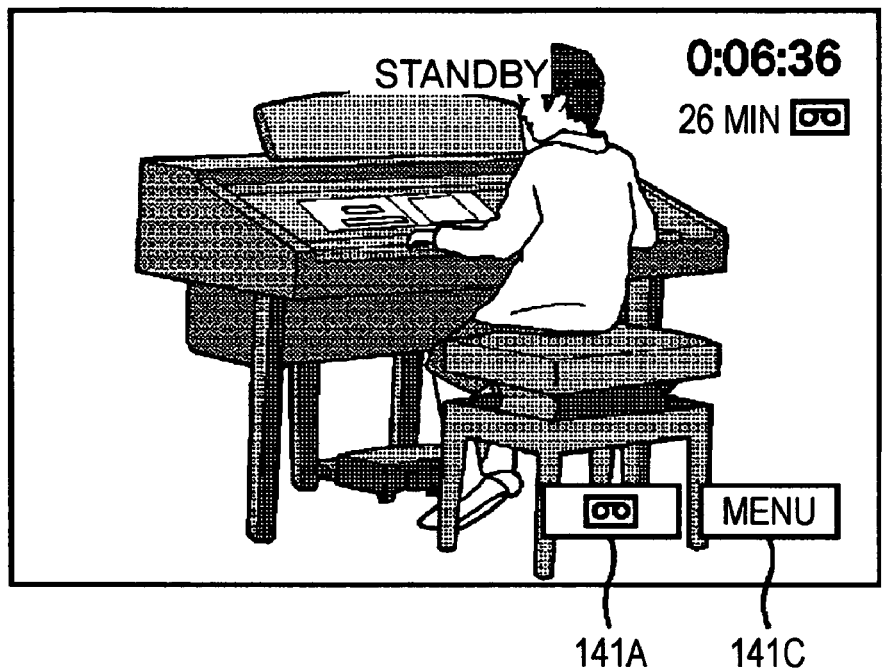

For example, at STEP S53, the display control unit 123 displays an image shown in FIG. 12 on the LCD panel 34 on the basis of the determination result supplied from the recording medium determining unit 122. In the image displayed on the LCD panel 34, images of buttons 141A and 141C are superimposed on an image of a subject. The operation of the button 141A allows the user to view movies (or still images) recorded on the magnetic tape. The operation of the button 141C allows the user to display a menu screen having selectable operation items listed thereon.

More specifically, when the digital video camera 101 is turned on and is equipped only with the magnetic tape, functions of viewing movies recorded on the magnetic tape and of displaying a menu screen are available (or operable by the user). Thus, buttons 141A and 141C for these functions are displayed on the LCD panel 34.

Figure 11:
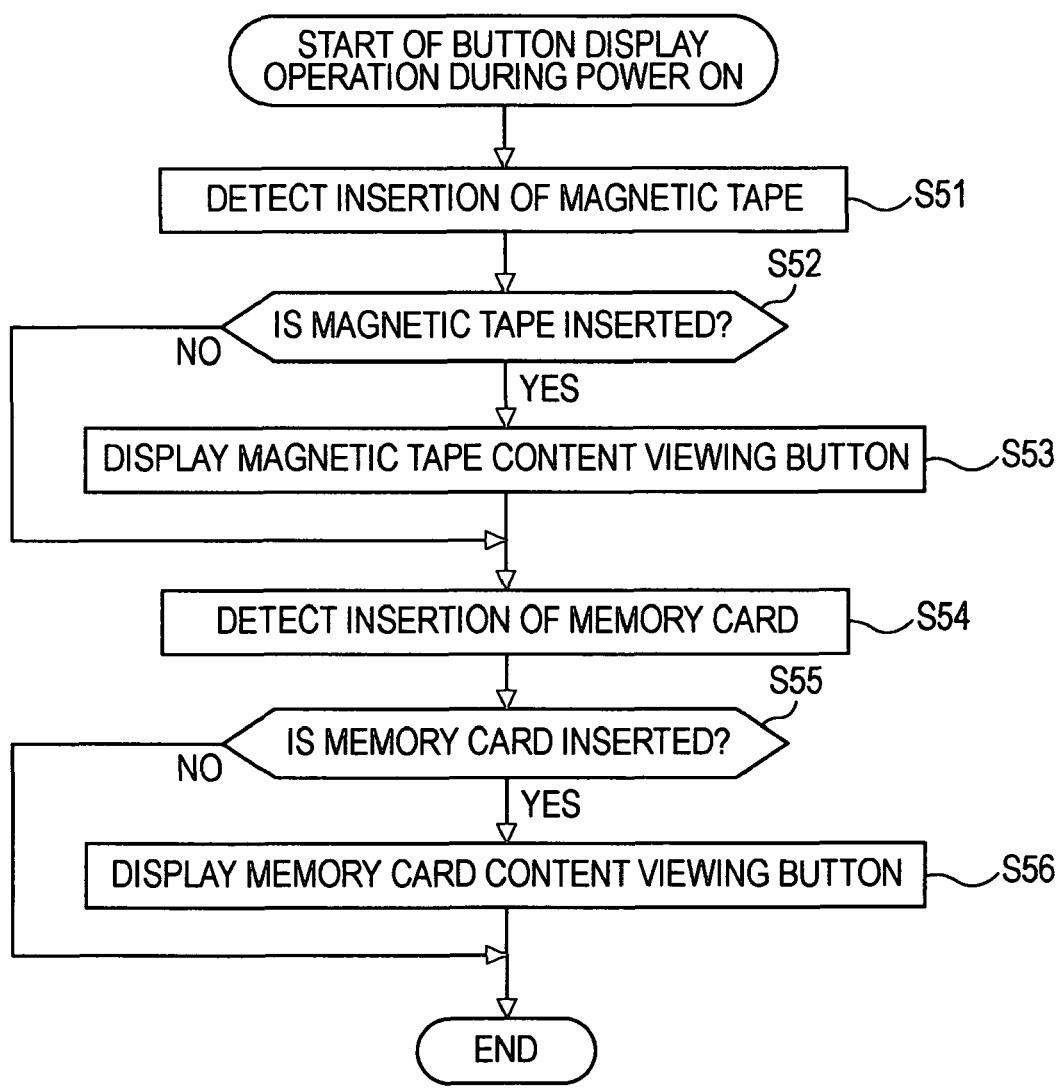

Referring back to the flowchart shown in FIG. 11, at STEP S52, if the recording medium determining unit 122 determines that the digital video camera 101 is not equipped with the magnetic tape, displaying of the button 141A is not necessary. Thus, STEP S53 is skipped and the process proceeds to STEP S54.

At STEP S54, the recording medium detecting unit 121 detects equipment of the memory card, and supplies the detection result to the recording medium determining unit 122.

At STEP S55, the recording medium determining unit 122 determines whether or not the digital video camera 101 is equipped with the memory card on the basis of the detection result supplied from the recording medium detecting unit 121.

At STEP S55, if the recording medium determining unit 122 determines that the digital video camera 101 is equipped with the memory card, the process proceeds to STEP S56. At STEP S56, the display control unit 123 displays a predetermined screen to be displayed when the memory card is equipped on the LCD panel 34 on the basis of the determination result supplied from the recording medium determining unit 122. Accordingly, the digital video camera 101 finishes the button display operation at the time of power on.

Figure 13:
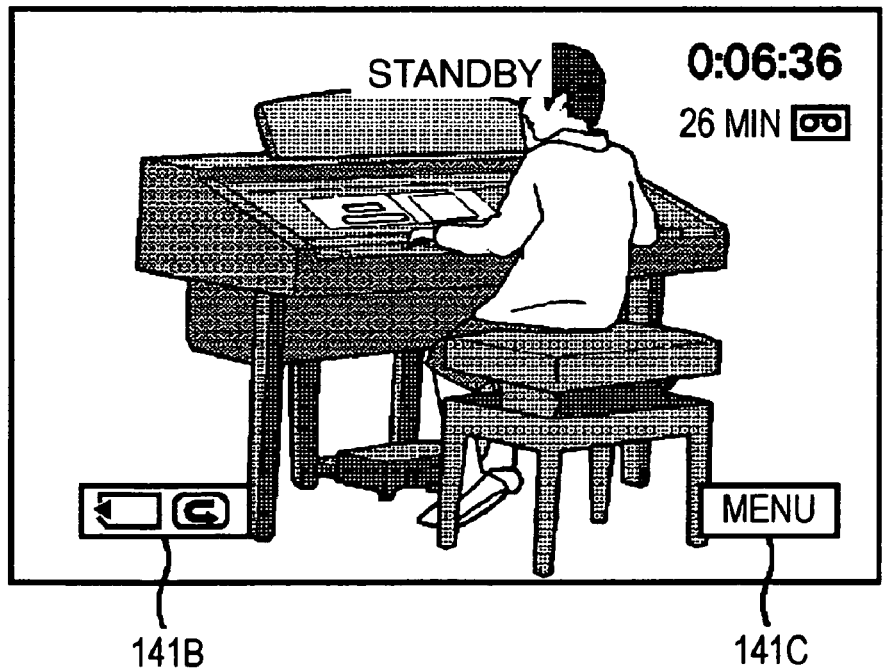

For example, at STEP S56, the display control unit 123 displays an image shown in FIG. 13 on the LCD panel 34 on the basis of the determination result supplied from the recording medium determining unit 122. In the image displayed on the LCD panel 34, images of buttons 141B and 141C are superimposed on an image of a subject. The operation of the button 141B allows the user to view still images (or movies) recorded on the memory card.

More specifically, when the digital video camera 101 is turned on and is equipped only with the memory card, functions of viewing still images recorded on the memory card and of displaying a menu screen are available (or operable by the user). Thus, the buttons 141B and 141C for these functions are displayed on the LCD panel 34.

Figure 14:
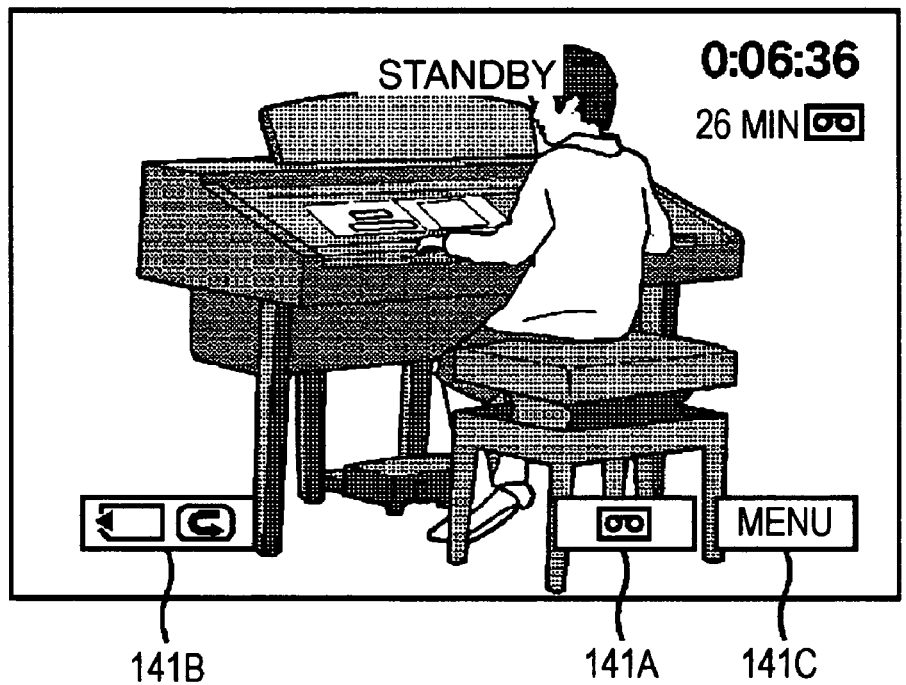

In addition, in the button display operation at the time of power on shown in the flowchart of FIG. 11, when the recording medium determining unit 122 determines that the digital video camera 101 is equipped with both the magnetic tape and the memory card, the display control unit 123 displays an image shown in FIG. 14 on the LCD panel 34 on the basis of the determination result supplied from the recording medium determining unit 122. In the displayed image, the buttons 141A to 141C are superimposed on the image of the subject.

More specifically, when the digital video camera 101 is turned on and is equipped with both the magnetic tape and the memory card, functions of viewing movies recorded on the magnetic tape, of viewing still images recorded on the memory card, and of displaying a menu screen are available (or operable by the user). Thus, the buttons 141A to 141C for these functions are displayed on the LCD panel 34.

Referring back to the flowchart shown in FIG. 11, at STEP S55, if the recording medium determining unit 122 determines that the digital video camera 101 is not equipped with the memory card, displaying of the button 141B is not necessary. Thus, STEP S56 is skipped and the digital video camera 101 finishes the button display operation performed at the time of power on.

Figure 15:
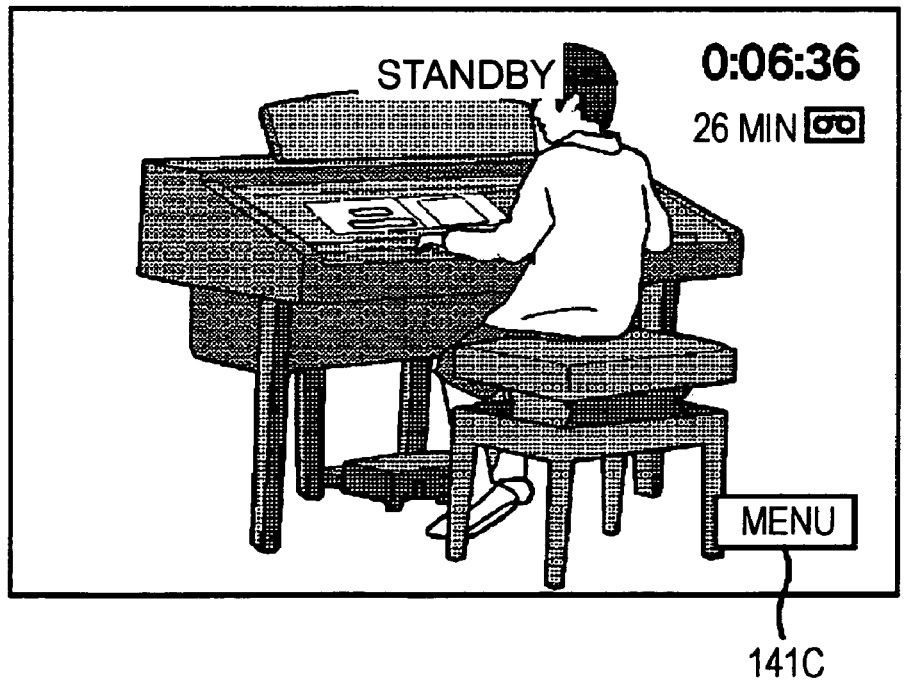

In addition, in the button display operation at the time of power on shown the flowchart of FIG. 11, if the digital video camera 101 is not equipped with the magnetic tape nor the memory card, the display control unit 123 displays an image shown in FIG. 15 on the LCD panel 34 on the basis of the determination result supplied from the recording medium determining unit 122. In the displayed image, only the button 141C is superimposed on the image of the subject.

More specifically, when the digital video camera 101 is turned on and is not equipped with the magnetic tape nor the memory card, only a function of displaying a menu screen is available (or operable by the user). Thus, the button 141C for this function is displayed on the LCD panel 34.

Accordingly, the digital video camera 101 does not display buttons for functions relating to the recording medium not equipped to the digital video camera 101. Unnecessary buttons are not displayed on the LCD panel 34, which is originally used for confirming the image being shot, thus preventing the image being shot from being obscured by the buttons.

Users that use only one (e.g., the magnetic tape) of two equippable recording media (e.g., the magnetic tape and the memory card) do not need the button (e.g., the button 141B) for the functions relating to the other recording medium (e.g., the memory card). Since the digital video camera 101 does not display the button for the functions relating to the recording medium not being equipped, unused buttons are not displayed. As a result, the users are not irritated by the displayed unused buttons.

In the above-described embodiment, the buttons 141A and 141C are used as the buttons to be displayed on the LCD panel 34 when the magnetic tape is equipped. In addition, the buttons 141B and 141C are used as the buttons to be displayed when the memory card is equipped. The present invention is not limited to this particular example.

More specifically, although the buttons 141A and 141C are assigned for the functions that are available when the magnetic tape is equipped and that are relating to the magnetic tape and the menu, these buttons can be assigned for other functions available when the magnetic tape is equipped. In addition, although the buttons 141B and 141C are assigned for the functions that are available when the memory card is equipped and that are relating to the memory card and the menu, these buttons can also be assigned for other functions available when the memory card is equipped.

Additionally, for example, the button 141A is described as an example of a button for the function relating to the magnetic tape. In the embodiment, the button 141A may be a button for one of various functions relating to the magnetic tape. Here, the various functions include deletion of movies (or still images) recorded on the magnetic tape, changing of a recording format or a size of movies (or still images) to be shot, and shooting of movies (or still images). Likewise, the button 141B is described as an example of a button for the function relating to the memory card. In the embodiment, the button 141B may be a button for one of various functions relating to the memory card. Here, the various functions include deletion of still images (or movies) recorded on the memory card, changing of a recording format or a size of still images (or movies) to be shot, and shooting of still images (or movies).

The digital video camera 101 displays the buttons for the functions available when the magnetic tape is equipped and does not displays those for functions not available when the magnetic tape is equipped. The buttons may be assigned for any functions as long as these conditions are satisfied. Likewise, the digital video camera 101 displays the buttons for the functions available when the memory card is equipped and does not displays those for functions not available when the memory card is equipped. The buttons may be assigned for any functions as long as these conditions are satisfied.

The above-described flowchart shown in FIG. 11 describes the button display operation at the time of power on. When the recording media 26 and 30 are removed from or equipped to the digital video camera 101, the digital video camera 101 also controls displaying of buttons on the LCD panel 34.

In the following, referring first to a flowchart shown in FIG. 16, a button display operation at the time of removal of the magnetic tape will be described. Referring then to a flowchart shown in FIG. 17, a button display operation at the time of equipment of the magnetic tape will be described.

Figure 16:
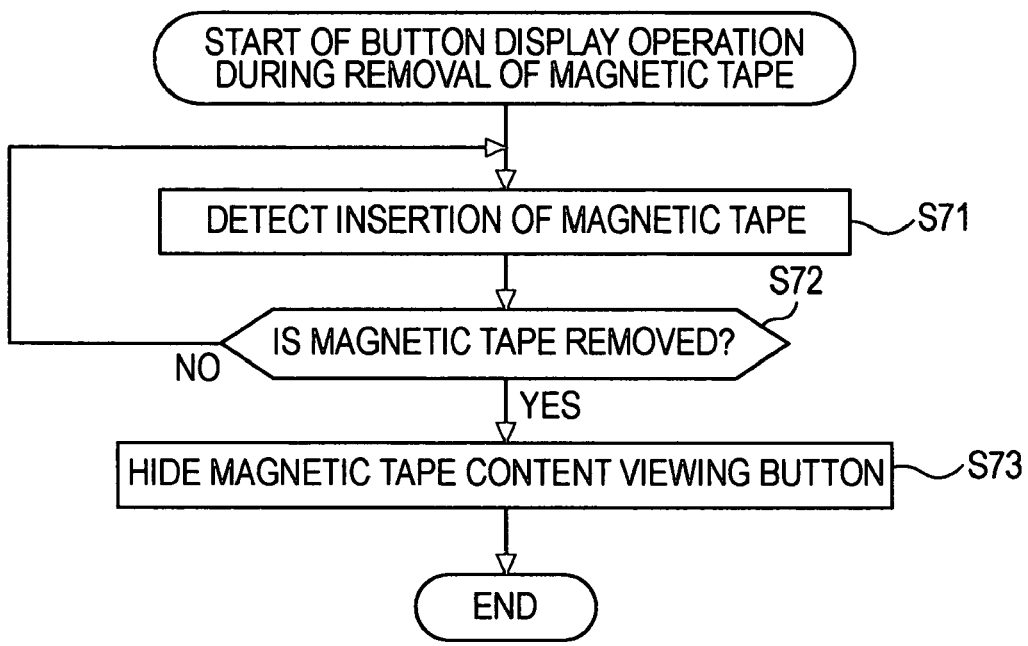
FIG. 16 is a flowchart showing a button display operation at the time of removal of a magnetic tape.
Figure 17:
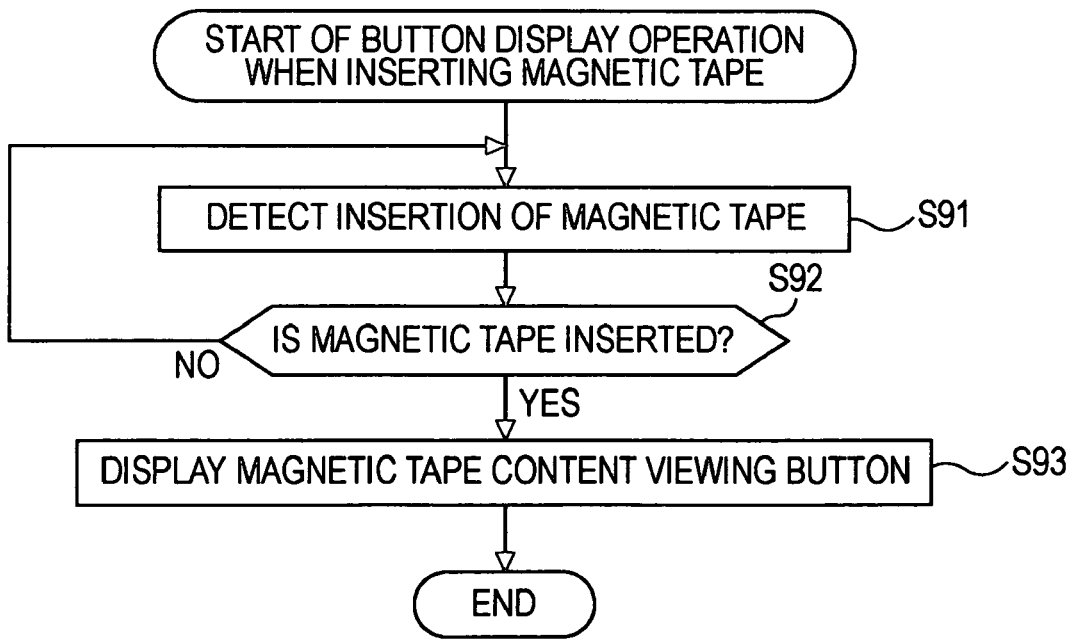
FIG. 17 is a flowchart showing a button display operation at the time of equipment of a magnetic tape.

In the flowcharts shown in FIGS. 16 and 17, a magnetic tape is used as an example of the recording medium 26. The type of the recording medium 26 is not limited to this particular example, and the same operation is performed on other types of recording medium. For example, the same operation is performed for the recording medium 30 such as a memory card. In addition, it is supposed that the digital video camera 101 is equipped with the magnetic tape in the button display operation shown in FIG. 16, and that the digital video camera 101 is not equipped with the magnetic tape in the button display operation shown in FIG. 17.

After the digital video camera 101 is turned on in response to the instruction of power on given by a user through the power button 31A, the microprocessor 21 causes each unit of the digital video camera 101 to perform the button display operation shown in the flowchart of FIG. 16 at the time of removal of the magnetic tape.

At STEP S71, the recording medium detecting unit 121 detects equipment of the magnetic tape, and supplies the detection result to the recording medium determining unit 122.

At STEP S72, the recording medium determining unit 122 determines whether or not the magnetic tape is removed from the digital video camera 101 on the basis of the detection result supplied from the recording medium detecting unit 121.

At STEP S72, if the recording medium determining unit 122 determines that the magnetic tape is not removed, the process returns to STEP S71, and the above-described step is repeated. More specifically, the digital video camera 101 works according to user operations until removal of the magnetic tape.

On the other hand, at STEP S72, if the recording medium determining unit 122 determines that the magnetic tape is removed, the process proceeds to STEP S73. At STEP S73, the display control unit displays a predetermined screen on the LCD panel 34 on the basis of the determination result supplied from the recording medium determining unit 122. In the predetermined screen, the button for viewing the content of the magnetic tape is not displayed. The digital video camera 101 then finishes the button display operation at the time of removal of the magnetic tape.

For example, at STEP S73, the display control unit 123 displays the above-described image shown in FIG. 13 or 15 on the LCD panel 34 on the basis of the determination result supplied from the recording medium determining unit 122. In the image, the button 141A for viewing movies (or still images) recorded on the magnetic tape is not superimposed on an image of a subject.

More specifically, the digital video camera 101 equipped with both the magnetic tape and the memory card displays the above-described image shown in FIG. 14 on the LCD panel 34. In the image, buttons 141A to 141C are superimposed on the image of the subject. At this time, a user's removal of the magnetic tape causes the image, shown in FIG. 13, having the buttons 141B and 141C superimposed on the image of the subject to be displayed on the LCD panel 34.

In addition, the digital video camera 101 equipped only with the magnetic tape displays the above-described image shown in FIG. 12 on the LCD panel 34. In the image, the buttons 141A and 141C are superimposed on the image of the subject. At this time, a user's removal of the magnetic tape causes the above-described image, shown in FIG. 15, having only the button 141C superimposed on the image of the subject to be displayed on the LCD panel 34.

That is, when the digital video camera 101 is turned on and the magnetic tape is removed therefrom, the function of viewing movies (or still images) recorded on the magnetic tape is not available (or is not operable by the user). Thus, the digital video camera 101 does not display the button 141A for the function on the LCD panel 34.

Additionally, after the digital video camera 101 is turned on in response to the instruction of power on given by a user through the power button 31A, the microprocessor 21 causes each unit of the digital video camera 101 to perform the button display operation shown in the flowchart of FIG. 17 at the time of equipment of the magnetic tape.

At STEP S91, the recording medium detecting unit 121 detects equipment of the magnetic tape, and supplies the detection result to the recording medium determining unit 122.

At STEP S92, the recording medium determining unit 122 determines whether or not the digital video camera 101 is equipped with the magnetic tape on the basis of the detection result supplied from the recording medium detecting unit 121.

At STEP S92, if the recording medium determining unit 122 determines that the digital video camera 101 is not equipped with the magnetic tape, the process returns to STEP S91, and the above-described step is repeated. More specifically, the digital video camera 101 works according to the user operations until the digital video camera 101 is equipped with the magnetic tape.

On the other hand, at STEP S92, if the recording medium determining unit 122 determines that the digital video camera 101 is equipped with the magnetic tape, the process proceeds to STEP S93. At STEP S93, the display control unit 123 displays a predetermined screen on the LCD panel 34 on the basis of the determination result supplied from the recording medium determining unit 122. In the predetermined image, a button for viewing the content of the magnetic tape is displayed. The digital video camera 101 then finishes the button display operation at the time of equipment of the magnetic tape.

For example, at STEP S93, the display control unit 123 displays the above-described image shown in FIG. 12 or 14 on the basis of the determination result supplied from the recording medium determining unit 122. In the image, the button 141A for viewing movies (or still images) recorded on the magnetic tape is superimposed on the image of the subject.

More specifically, the digital video camera 101 not equipped with magnetic tape nor memory card displays the above-described image, shown in FIG. 15, having only the button 141C superimposed on the image of the subject on the LCD panel 34. At this time, the user's equipment of the magnetic tape causes the image, shown in FIG. 12, having the buttons 141A and 141B superimposed on the image of the subject to be displayed on the LCD panel 34.

In addition, the digital video camera 101 equipped only with the memory card displays the above-described image shown in FIG. 13 on the LCD panel 34. In the image, the buttons 141B and 141C are superimposed on the image of the subject. At this time, the user's equipment of the magnetic tape causes the image, shown in FIG. 14, having the buttons 141A to 141C superimposed on the image of the subject, to be displayed on the LCD panel 34.

More specifically, when the digital video camera 101 is turned on and is equipped with the magnetic tape, the function of viewing movies (or still images) recorded on the magnetic tape is available (or operable by the user). Thus, the button 141A for the function is displayed on the LCD panel 34.

As described above, regardless of the types of the equipped recording media (e.g., the magnetic tape and the memory card) and the current recording mode (e.g., the tape recording mode and the memory card recording mode), the digital video camera 101 can change displaying of the buttons on the LCD panel 34 on the basis of whether or not the digital video camera 101 is equipped with the recording medium.

More specifically, since the digital video camera 101 does not display the button for the function relating to the recording medium not equipped, regardless of the currently equipped recording medium and the current recording mode, unused buttons are not displayed. As a result, the button 141B for the function relating to a memory card is not displayed on the LCD panel 34 when a memory card is not equipped for example, which allow users who do not uses the memory card to use the digital video camera 101 more comfortably.

As described above, the flowcharts shown in FIGS. 16 and 17 have described the button display operations at the times of removal and equipment of the magnetic tape (i.e., the recording medium 26). However, button display operations at the times of removal and equipment of the memory card (i.e., the recording medium 30) are also performed in the same manner.

Figure 18:
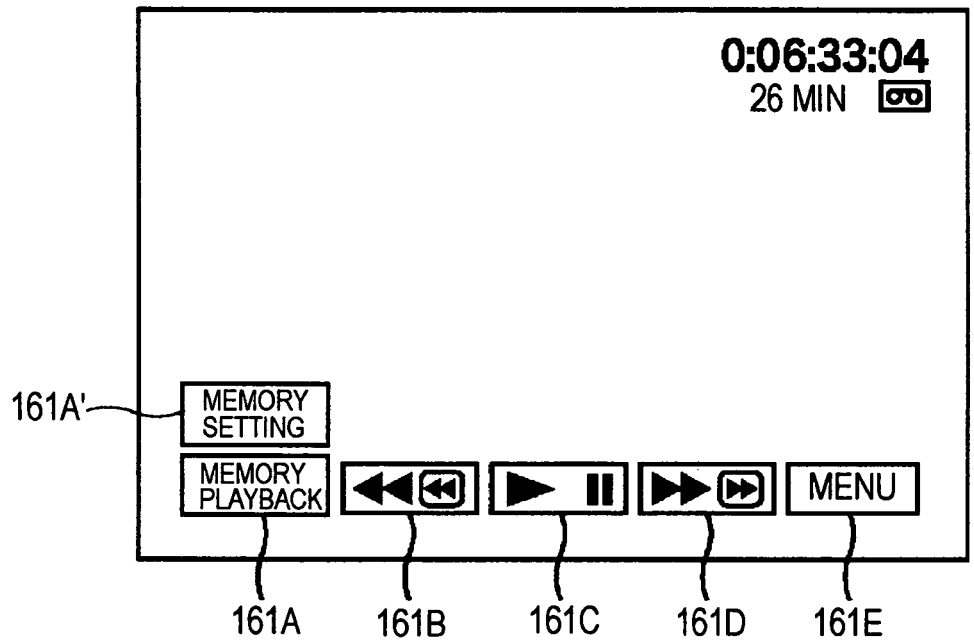
FIG. 18 is a diagram showing an example screen displayed on an LCD panel before a playback operation.
Figure 19:
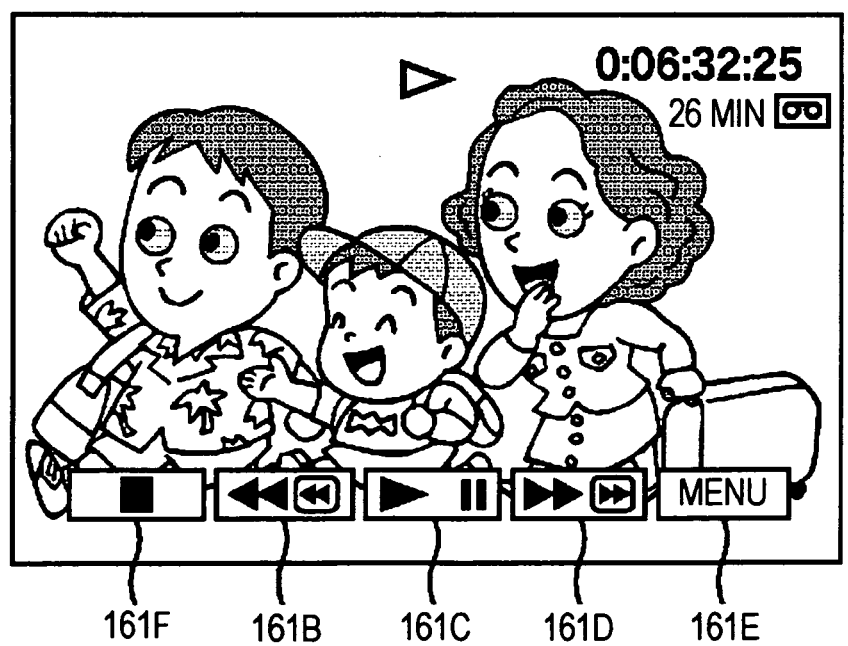
FIG. 19 is a diagram showing an example screen displayed on an LCD panel during a playback operation.

In the above-described embodiments, the digital video camera 11 controls displaying of the buttons on the LCD panel 34 on the basis of whether or not the shooting operation is performed. The digital video camera 11 controls displaying of the buttons on the LCD panel 34 in the same manner while playing back the image data recorded on the magnetic tape and the memory card. Referring to FIGS. 18 and 19, a button display operation during playback will be described below.

Before playing back the image data recorded on, for example, the magnetic tape, the digital video camera 11 displays buttons 161A, 161A', 161B, 161C, 161D, and 161E on the LCD panel 34 as shown in FIG. 18. The button 161A is for playing back the image data recorded on the memory card. The button 161A' is for performing settings relating to the memory card, such as settings of a format employed by the memory card and of changing of the size. The button 161B is for rewinding the played images. The button 161C is for playing back the images. The button 161D is for forwarding the played images. The button 161E is a menu button for displaying of a menu screen having operation items listed thereon.

While playing back the image in response to the instruction of playing back the image recorded on the magnetic tape given by the user through the button 161C, the digital video camera 11 displays a button 161F instead of the buttons 161A and 161A' in addition to the buttons 161B to 161E on the LCD panel 34. As mentioned above, the buttons 161A and 161A' are for playing back the image data recorded on the memory card and for performing settings relating to the memory card, respectively. The button 161F is for stopping the playback of the images.

More specifically, while the digital video camera 11 is playing back the image data recorded on the magnetic tape, the functions for performing the settings and for playing back the image data recorded on the memory card are not available (are not operable by the user). Thus, the button 161F for stopping the playback of the images is displayed on the LCD panel 34 instead of the buttons 161A and 161A'.

Accordingly, the digital video camera 11 does not display buttons for functions that are not available during the playback operation regardless of the equipped recording media (e.g., the magnetic tape and the memory card) and the current recording mode (e.g., the tape recording mode and the memory card recording mode). As a result, the unused buttons are not displayed, which allows the users to use the digital video camera 11 more comfortably.

As described above, the embodiments of the present invention can improve the operationality of digital video cameras.

In addition, according to the embodiments of the present invention, the digital video camera does not display the buttons for functions not available during the shooting operation regardless of the types of recording media and the current recording mode. As a result, it becomes easier for users to see the displayed image, thus allowing the user to shoot the image while confirming the image more clearly.

Furthermore, according to the embodiments of the present invention, the digital video camera does not display buttons for functions relating to the recording medium not equipped to the digital video camera regardless of the types of recording media and the current recording mode. As a result, users can operate the digital video camera more comfortably since only the buttons for the functions that the users use are displayed.

In the above-described embodiments, the description is given using two recording media, i.e., the magnetic tape and the memory card, for example. However, the present invention is not limited to this particular example, and can be employed in a case where the digital video camera is equipped with three or more recording media. In addition, a term "power off" includes a mechanical power off mode, a suspend mode, and a sleep mode.

The above-described series of steps can be executed by hardware or software. When the series of steps is executed by software, programs constituting the software may be installed, from a recording medium having the programs recorded thereon, in a computer embedded in a dedicated hardware or, for example, a general-purpose computer capable of performing various functions by installing various programs.

FIG. 20 is a block diagram showing an example of a configuration of a personal computer that executes the programs to perform the above-described series of steps. A CPU (Central Processing Unit) 211 performs various operations according to programs stored in a ROM (Read Only Memory) 212 or a storage unit 218. A RAM (Random Access Memory) 213 stores the programs executed by the CPU 211 and data if necessary. The CPU 211, the ROM 212, and the RAM 213 are interconnected via a bus 214.

The CPU 211 is also connected to an input/output interface 215 via the bus 214. The input/output interface 215 is connected to an input unit 216 and an output unit 217. The input unit 216 includes a switch and a microphone. The output unit 217 includes a display and a speaker. The CPU 211 performs various operations in response to the instructions supplied from the input unit 216. The CPU 211 then supplies the operation result to the output unit 217.

The storage unit 218 connected to the input/output interface 215 may include a hard disk, for example. The storage unit 218 stores the programs executed by the CPU 211 and various data. A communication unit 219 communicates with external devices via a network such as the Internet and a local area network. The programs may be obtained through the communication unit 219 and stored in the storage unit 218.

A drive 220 connected to the input/output interface 215 drives a removable medium 221 such as a magnetic disc, an optical disc, a magneto-optical disc, or a semiconductor memory so as to obtain programs and data recorded thereon. The obtained programs and data are transferred to and stored in the storage unit 218 if necessary.

Types of recording medium having programs, which is installed in a computer and is executable by the computer, recorded thereon include the removable medium 221, the ROM 212 temporarily or permanently storing the programs, and a hard disk constituting the storage unit 218. As mentioned above, the removable medium 211 may be a package medium such as a magnetic disc (including a flexible disc), an optical disc (including a CD-ROM (Compact Disc-Read Only Memory) and a DVD (Digital Versatile Disc)), a magneto-optical disc, or a semiconductor memory. The programs may be stored in the recording medium by the communication unit 219 using a communication medium with or without a cable if necessary. The communication unit 219 is an interface such as a router and a modem. The communication medium may be a local area network, the Internet, or a digital satellite broadcasting.

In this specification, the steps described in a program recorded on a recording medium include processing that is executed sequentially in the described order, and also includes processing that is executed in parallel or individually, not necessarily sequentially.

In addition, the embodiments of the present invention should not be limited to the above described embodiments, and various modifications can be made without departing from the spirit and scope of the present invention.

The invention claimed is:

1. An image capturing apparatus for capturing a first image of a subject, the image capturing apparatus comprising:
   detecting means for detecting a user's operation for instructing activation of a function;
   determining means for determining whether or not an instruction of capturing the first image is given on the basis of the detected instruction; and
   display control means for controlling, when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

2. The apparatus according to claim 1, wherein the display control means controls, when the instruction of capturing the first image is determined not to be given, displaying of the third image so that the third image is superimposed on the first image.

3. The apparatus according to claim 2, wherein the second images include
- a first icon allowing the user to instruct displaying of a screen that allows a user to select various functions,
- a second icon allowing the user to instruct activation of a function that is operable by the user when the image capturing apparatus is equipped with a first recording medium, and
- a third icon allowing the user to instruct activation of a function that is operable by the user when the image capturing apparatus is equipped with a second recording medium, and wherein the third image is one of the second icon and the third icon.

4. An image capturing method for an image capturing apparatus for capturing a first image of a subject, the method comprising:
- detecting a user's operation for instructing activation of a function;
- determining whether or not an instruction of capturing the first image is given on the basis of the detected instruction; and
- controlling, when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

5. A program causing a computer of an image capturing apparatus for capturing a first image of a subject to perform an image capturing process, the process comprising:
- detecting a user's operation for instructing activation of a function;
- determining whether or not an instruction of capturing the first image is given on the basis of the detected instruction; and
- controlling, when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

6. An image capturing apparatus, equippable with a first recording medium and a second recording medium, for capturing a first image of a subject, the image capturing apparatus comprising:
- detecting means for detecting whether or not the image capturing apparatus is equipped with the first recording medium and the second recording medium;
- determining means for determining whether or not the image capturing apparatus is equipped with the first recording medium and the second recording medium on the basis of the detection result; and
- display control means for controlling, when the second recording medium is determined not to be equipped, displaying of a third image among second images so that the third image is not superimposed on the first image, and for controlling, when the first recording medium is determined not to be equipped, displaying of a fourth image among the second images so that the fourth image is not superimposed on the first image, the second images allowing the user to instruct activation of various functions, the third image allowing the user to instruct activation of a function that is operable by the user when the image capturing apparatus is equipped with the second recording medium and the fourth image allowing the user to instruct activation of a function that is operable by the user when the image capturing apparatus is equipped with the first recording medium.

7. The apparatus according to claim 6, wherein the display control means controls, when the second recording medium is determined to be equipped, displaying of the third image so that the third image is superimposed on the first image.

8. The apparatus according to claim 7, wherein the second images include
- a first icon allowing the user to instruct displaying of a screen that allows a user to select various functions,
- a second icon allowing the user to instruct activation of a function that is operable by the user when the image capturing apparatus is equipped with the first recording medium, and
- a third icon allowing the user to instruct activation of a function that is operable by the user when the image capturing apparatus is equipped with the second recording medium, and wherein the third image is the third icon.

9. The apparatus according to claim 6, wherein the first recording medium is a memory card, whereas the second recording medium is a magnetic tape.

10. An image capturing method for an image capturing apparatus equippable with a first recording medium and a second recording medium, for capturing a first image of a subject, the method comprising:
- detecting whether or not the image capturing apparatus is equipped with the first recording medium and the second recording medium;
- determining whether or not the image capturing apparatus is equipped with the first recording medium and the second recording medium on the basis of the detection result;
- controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the image capturing apparatus is equipped with the second recording medium; and
- controlling, when the first recording medium is determined not to be equipped, displaying of a fourth image among the second images so that the fourth image is not superimposed on the first image, the fourth image allowing the user to instruct activation of a function that is operable by the user when the image capturing apparatus is equipped with the first recording medium.

11. A program causing a computer of an image capturing apparatus equippable with a first recording medium and a second recording medium, for capturing a first image of a subject, to perform an image capturing process, the process comprising:
- detecting whether or not the image capturing apparatus is equipped with the first recording medium and the second recording medium;
- determining whether or not the image capturing apparatus is equipped with the first recording medium and the second recording medium on the basis of the detection result;
- controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the image capturing apparatus is equipped with the second recording medium; and controlling, when the first recording medium is determined not to be equipped, displaying of a fourth image among the second images so that the fourth image is not superimposed on the first image, the fourth image allowing the user to instruct activation of a function that is operable by the user when the image capturing apparatus is equipped with the first recording medium.

12. A playback apparatus for playing back a first image of a subject, the playback apparatus comprising:

detecting means for detecting a user's operation for instructing activation of a function;

determining means for determining whether or not an instruction of playing back the first image is given on the basis of the detected instruction; and display control means for controlling, when the instruction of playing back the first image is determined to be given and while the first image is played back in response to the instruction of playing back the first image, displaying of a third image among second images so that the third image is not superimposed on the first image, the second images allowing the user to instruct activation of various functions, and the third image allowing the user to instruct activation of a function that is not operable by the user during the playback of the first image.

13. The apparatus according to claim 12, wherein the display control means controls, when the instruction of playing back the first image is determined not to be given, displaying of the third image so that the third image is superimposed on the first image.

14. The apparatus according to claim 13, wherein the second images include a first icon allowing the user to instruct displaying a screen that allows a user to select various functions, a second icon allowing the user to instruct activation of a function that is operable by the user when the playback apparatus is equipped with a first recording medium, and a third icon allowing the user to instruct activation of a function that is operable by the user when the playback apparatus is equipped with a second recording medium, and wherein the third image is one of the second icon and the third icon.

15. A playback method for a playback apparatus for playing back a first image of a subject, the method comprising:

detecting a user's operation for instructing activation of a function;

determining whether or not an instruction of playing back the first image is given on the basis of the detected instruction; and controlling, when the instruction of playing back the first image is determined to be given and while the first image is played back in response to the instruction of playing back the first image, displaying of a third image among second images so that the third image is not superimposed on the first image, the second images allowing the user to instruct activation of various functions, and the third image allowing the user to instruct activation of a function that is not operable by the user during the playback of the first image.

16. A program causing a computer of a playback apparatus for playing back a first image of a subject to perform a playback process, the process comprising:

detecting a user's operation for instructing activation of a function;

determining whether or not an instruction of playing back the first image is given on the basis of the detected instruction; and controlling, when the instruction of playing back the first image is determined to be given and while the first image is played back in response to the instruction of playing back the first image, displaying of a third image among second images so that the third image is not superimposed on the first image, the second images allowing the user to instruct activation of various functions, and the third image allowing the user to instruct activation of a function that is not operable by the user during the playback of the first image.

17. A playback apparatus for playing back a first image of a subject, the playback apparatus comprising:

detecting means for detecting a first recording medium and a second recording medium to be equipped to the playback apparatus;

determining means for determining whether or not the playback apparatus is equipped with the first recording medium and the second recording medium on the basis of the detection result; and display control means for controlling, when the second recording medium is determined not to be equipped, displaying of a third image among second images so that the third image is not superimposed on the first image, and for controlling, when the first recording medium is determined not to be equipped, displaying of a fourth image among the second images so that the fourth image is not superimposed on the first image, the second images allowing the user to instruct activation of various functions, the third image allowing the user to instruct activation of a function that is operable by the user when the playback apparatus is equipped with the second recording medium and the fourth image allowing the user to instruct activation of a function that is operable by the user when the image capturing apparatus is equipped with the first recording medium.

18. The apparatus according to claim 17, wherein the display control means controls, when the second recording medium is determined to be equipped, displaying of the third image so that the third image is superimposed on the first image.

19. The apparatus according to claim 18, wherein the second images include a first icon allowing the user to instruct displaying a screen that allows a user to select various functions, a second icon allowing the user to instruct activation of a function that is operable by the user when the playback apparatus is equipped with the first recording medium, and a third icon allowing the user to instruct activation of a function that is operable by the user when the playback apparatus is equipped with the second recording medium, and wherein the third image is the third icon.

20. The apparatus according to claim 17, wherein the first recording medium is a memory card, whereas the second recording medium is a magnetic tape.

21. A playback method for a playback apparatus for playing back a first image of a subject, the method comprising:

detecting a first recording medium and a second recording medium to be equipped to the playback apparatus;

determining whether or not the playback apparatus is equipped with the first recording medium and the second recording medium on the basis of the detection result;

controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the playback apparatus is equipped with the second recording medium; and controlling, when the first recording medium is determined not to be equipped, displaying of a fourth image among the second images so that the fourth image is not superimposed on the first image, and the fourth image allowing the user to instruct activation of a function that is operable by the user when the playback apparatus is equipped with the first recording medium.

22. A program causing a computer of a playback apparatus for playing back a first image of a subject to perform a playback process, the process comprising:

detecting a first recording medium and a second recording medium to be equipped to the playback apparatus;

determining whether or not the playback apparatus is equipped with the first recording medium and the second recording medium on the basis of the detection result; and controlling, when the second recording medium is determined not to be equipped, displaying of a third image among second images so that the third image is not superimposed on the first image, the second images allowing the user to instruct activation of various functions, and the third image allowing the user to instruct activation of a function that is operable by the user when the playback apparatus is equipped with the second recording medium; and controlling, when the first recording medium is determined not to be equipped, displaying of a fourth image among the second images so that the fourth image is not superimposed on the first image, and the fourth image allowing the user to instruct activation of a function that is operable by the user when the playback apparatus is equipped with the first recording medium.

23. An image capturing apparatus for capturing a first image of a subject, the image capturing apparatus comprising:

a detecting unit for detecting a user's operation for instructing activation of a function;

a determining unit for determining whether or not an instruction of capturing the first image is given on the basis of the detected instruction; and a display control unit for controlling, when the instruction of capturing the first image is determined to be given, displaying of a third image among second images so that the third image is not superimposed on the first image, the second images allowing the user to instruct activation of various functions, and the third image allowing the user to instruct activation of a function that is not operable by the user during the image capturing operation.

24. An image capturing apparatus equippable with a first recording medium and a second recording medium, for capturing a first image of a subject, the image capturing apparatus comprising:

a detecting unit for detecting whether or not the image capturing apparatus is equipped with the first recording medium and the second recording medium;

a determining unit for determining whether or not the image capturing apparatus is equipped with the first recording medium and the second recording medium on the basis of the detection result; and a display control unit for controlling, when the second recording medium is determined not to be equipped, displaying of a third image among second images so that the third image is not superimposed on the first image, and for controlling, when the first recording medium is determined not be equipped, displaying of a fourth image among the second images so that the fourth image is not superimposed on the first image, the second images allowing the user to instruct activation of various functions, the third image allowing the user to instruct activation of a function that is operable by the user when the image capturing apparatus is equipped with the second recording medium and the fourth image allowing the user to instruct activation of a function that is operable by the user when the image capturing apparatus is equipped with the first recording medium.

25. A playback apparatus for playing back a first image of a subject, the playback apparatus comprising:

a detecting unit for detecting a user's operation for instructing activation of a function;

a determining unit for determining whether or not an instruction of playing back the first image is given on the basis of the detected instruction; and a display control unit for controlling, when the instruction of playing back the first image is determined to be given and while the first image is played back in response to the instruction of playing back the first image, displaying of a third image among second images so that the third image is not superimposed on the first image, the second images allowing the user to instruct activation of various functions, and the third image allowing the user to instruct activation of a function that is not operable by the user during the playback of the first image.

26. A playback apparatus for playing back a first image of a subject, the playback apparatus comprising:

a detecting unit for detecting a first recording medium and a second recording medium to be equipped to the playback apparatus;

a determining unit for determining whether or not the playback apparatus is equipped with the first recording medium and the second recording medium on the basis of the detection result; and a display control unit for controlling, when the second recording medium is determined not to be equipped, displaying of a third image among second images so that the third image is not superimposed on the first image, and for controlling, when the first recording medium is determined not be equipped, displaying of a fourth image among the second images so that the fourth image is not superimposed on the first image, the second images allowing the user to instruct activation of various functions, the third image allowing the user to instruct activation of a function that is operable by the user when the playback apparatus is equipped with the second recording medium and the fourth image allowing the user to instruct activation of a function that is operable by the user when the playback apparatus is equipped with the first recording medium.

* * * * *